June 23, 1936.　　　A. W. KATH　　　2,044,947
CIGAR WRAPPING AND BANDING MACHINE
Filed Oct. 23, 1933　　　15 Sheets-Sheet 1
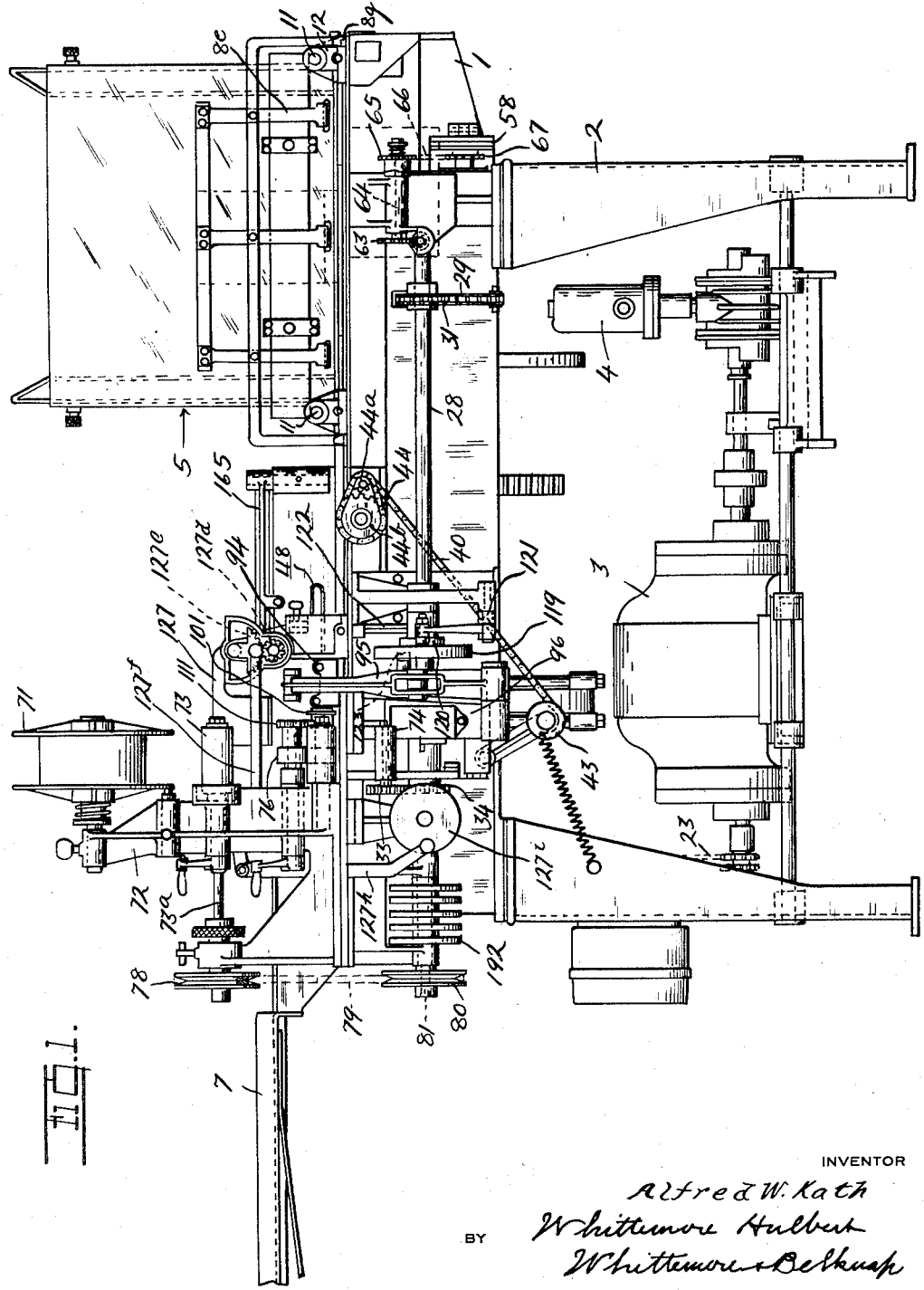
INVENTOR
Alfred W. Kath
BY Whittemore Hulbert
Whittemore + Belknap
ATTORNEYS

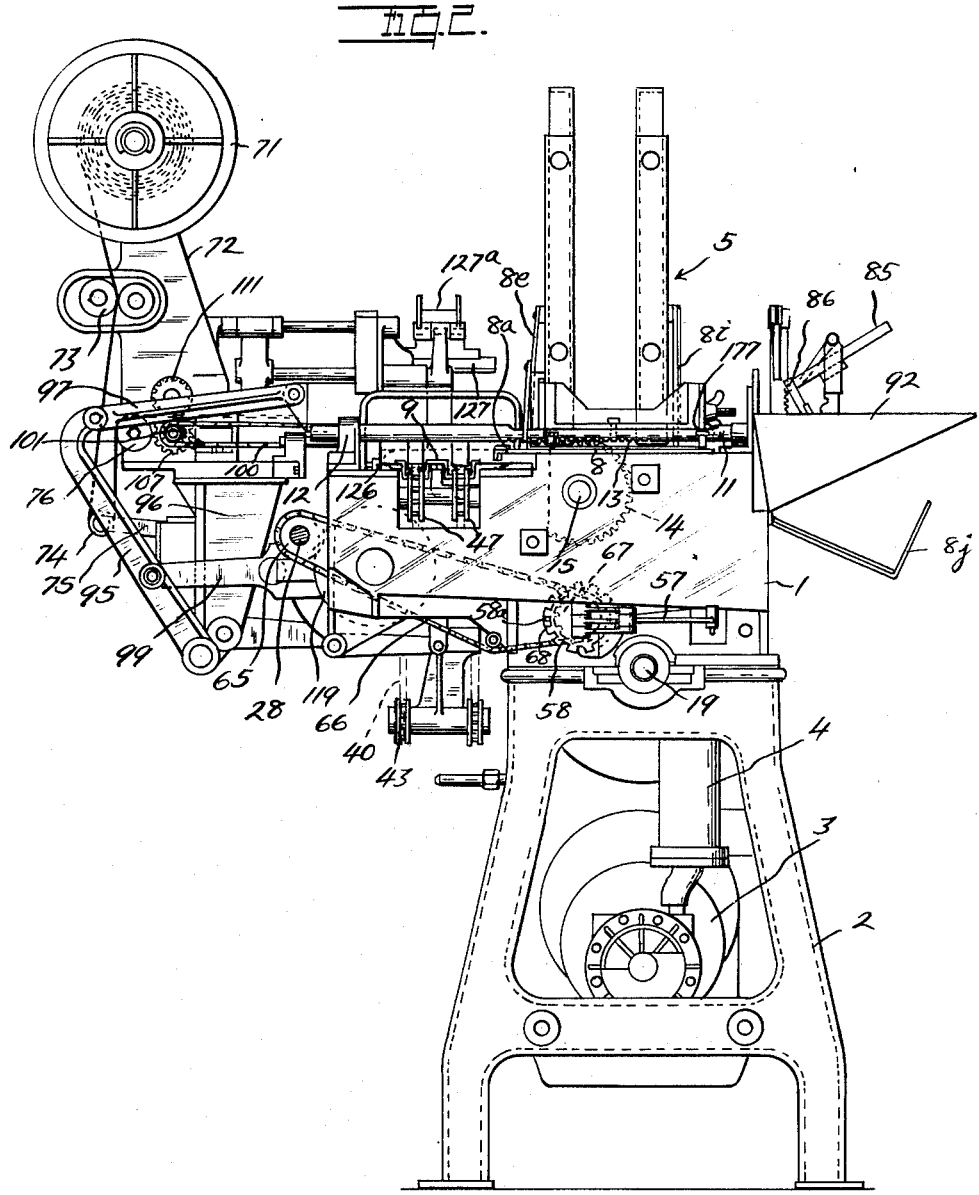

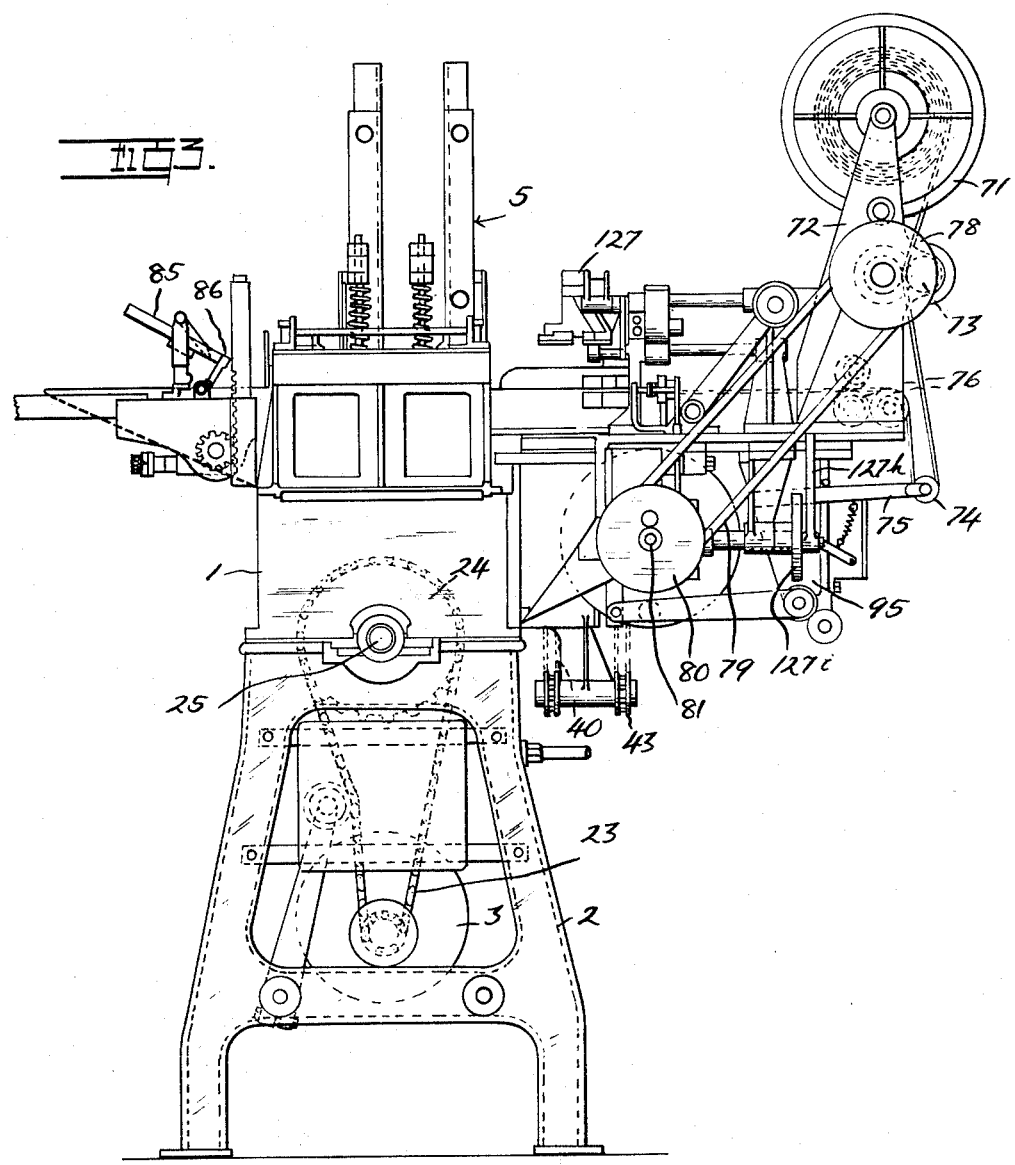

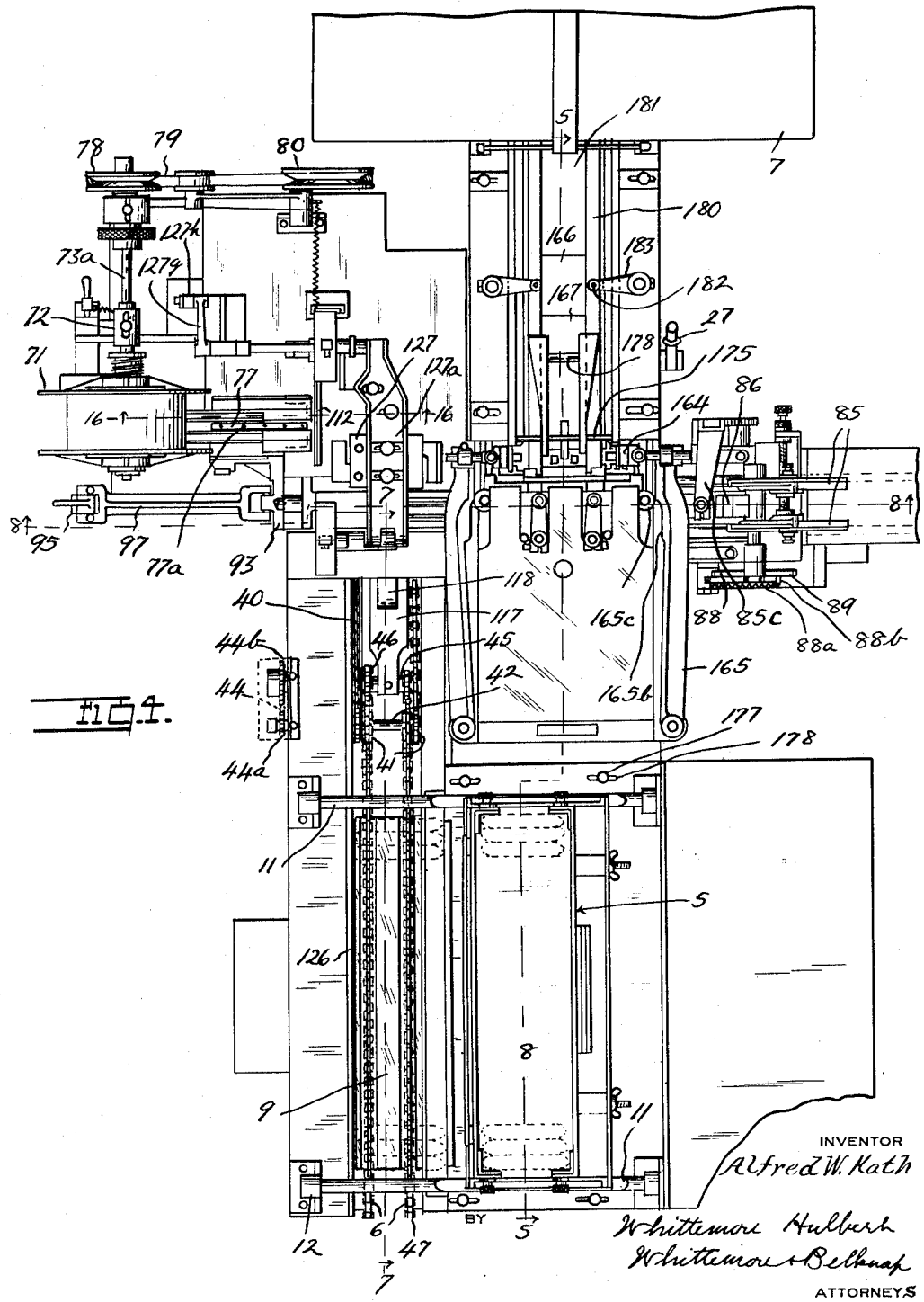

June 23, 1936.　　　　A. W. KATH　　　　2,044,947
CIGAR WRAPPING AND BANDING MACHINE
Filed Oct. 23, 1933　　　15 Sheets-Sheet 5
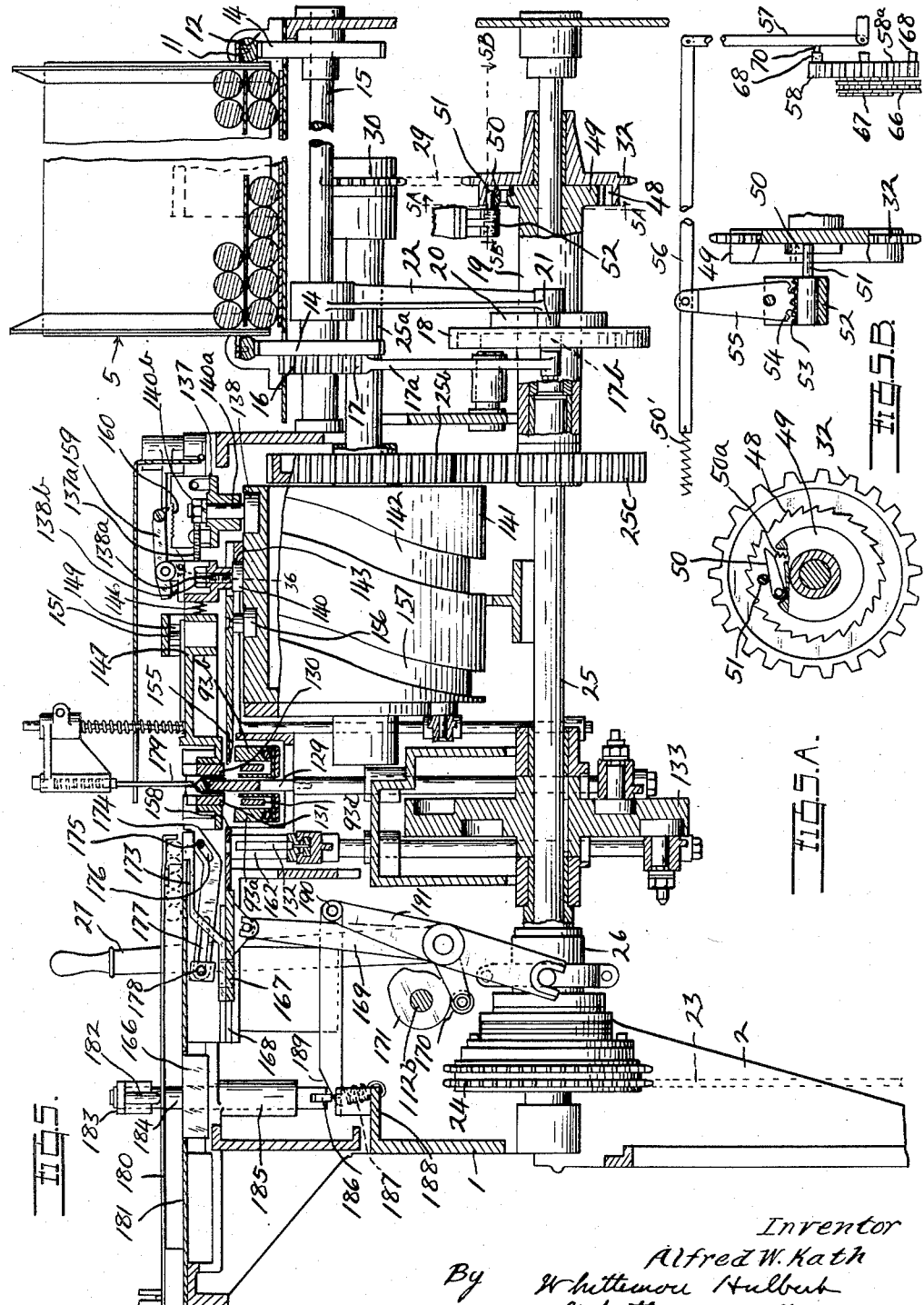
Inventor
Alfred W. Kath
By Whittemore Hulbert
Whittemore & Belknap
ATTORNEYS

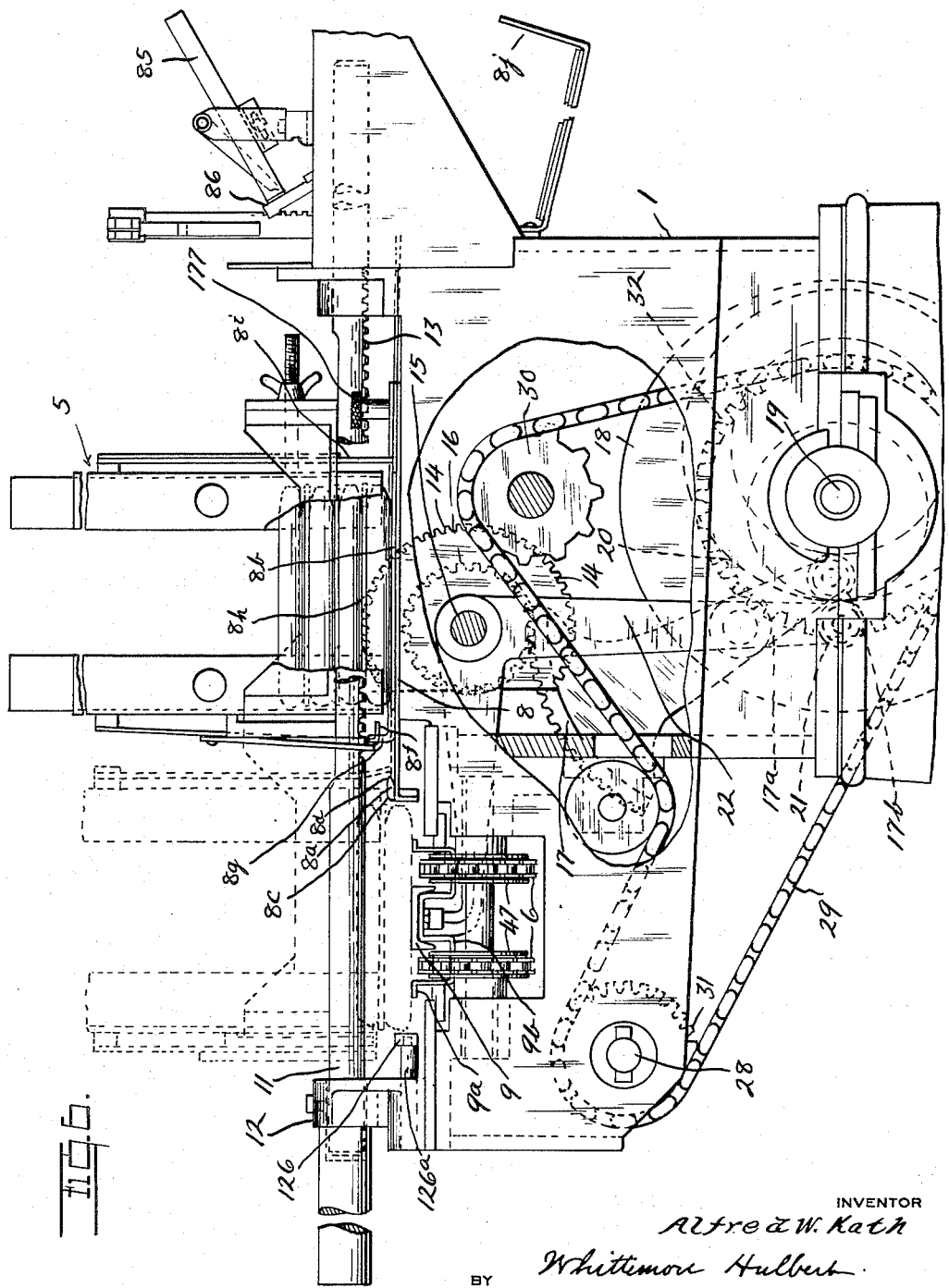

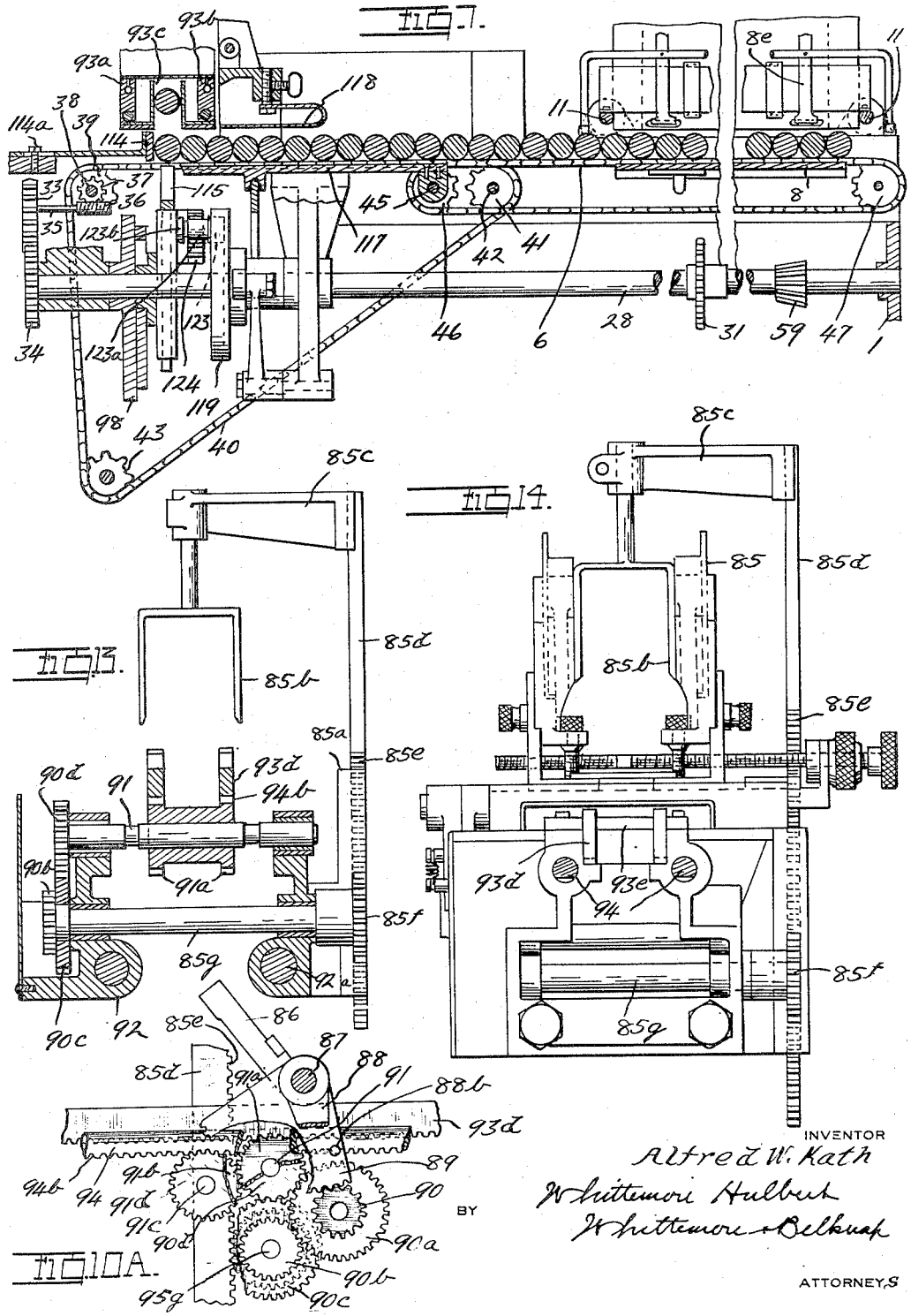

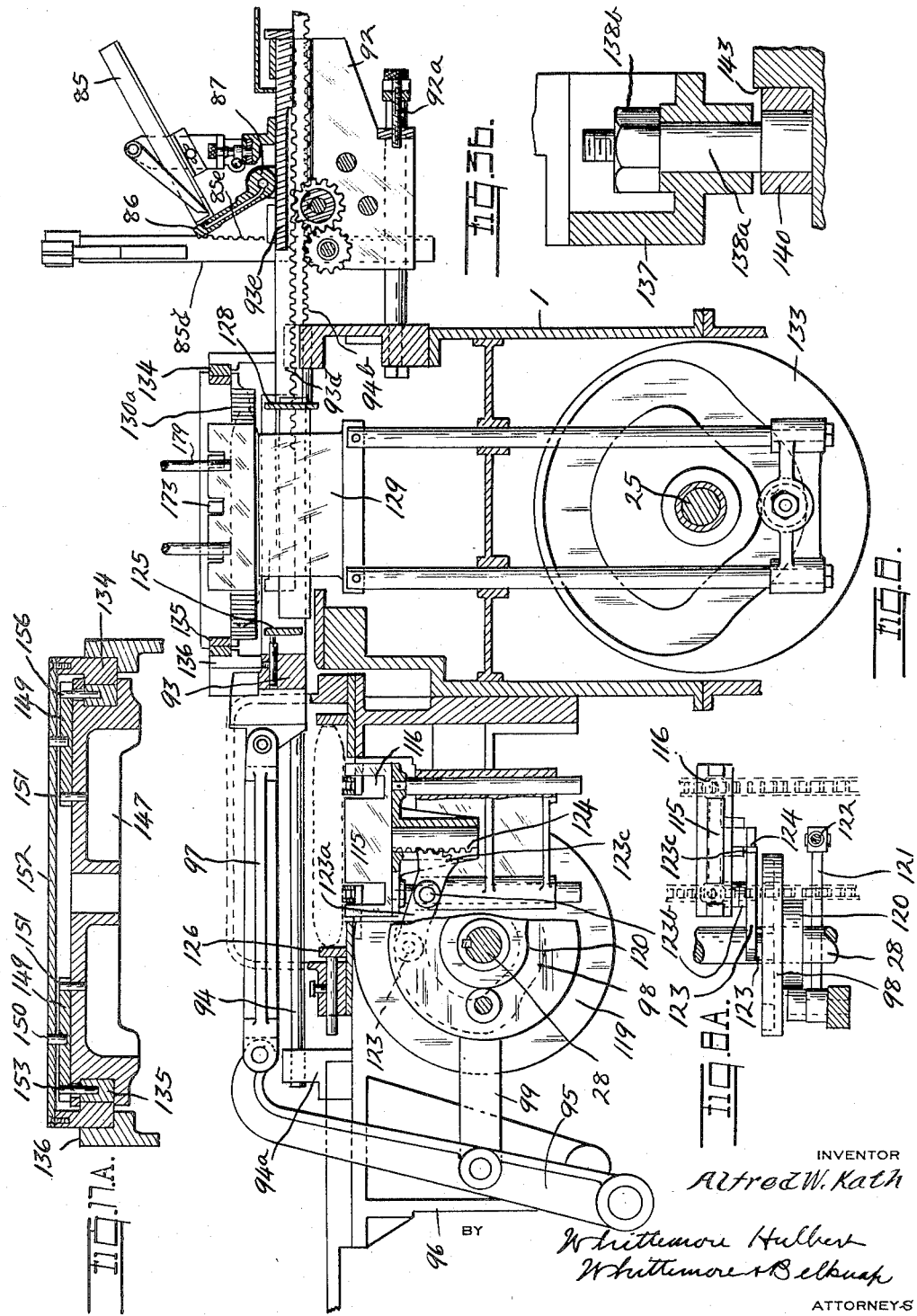

June 23, 1936.  A. W. KATH  2,044,947
CIGAR WRAPPING AND BANDING MACHINE
Filed Oct. 23, 1933   15 Sheets-Sheet 9
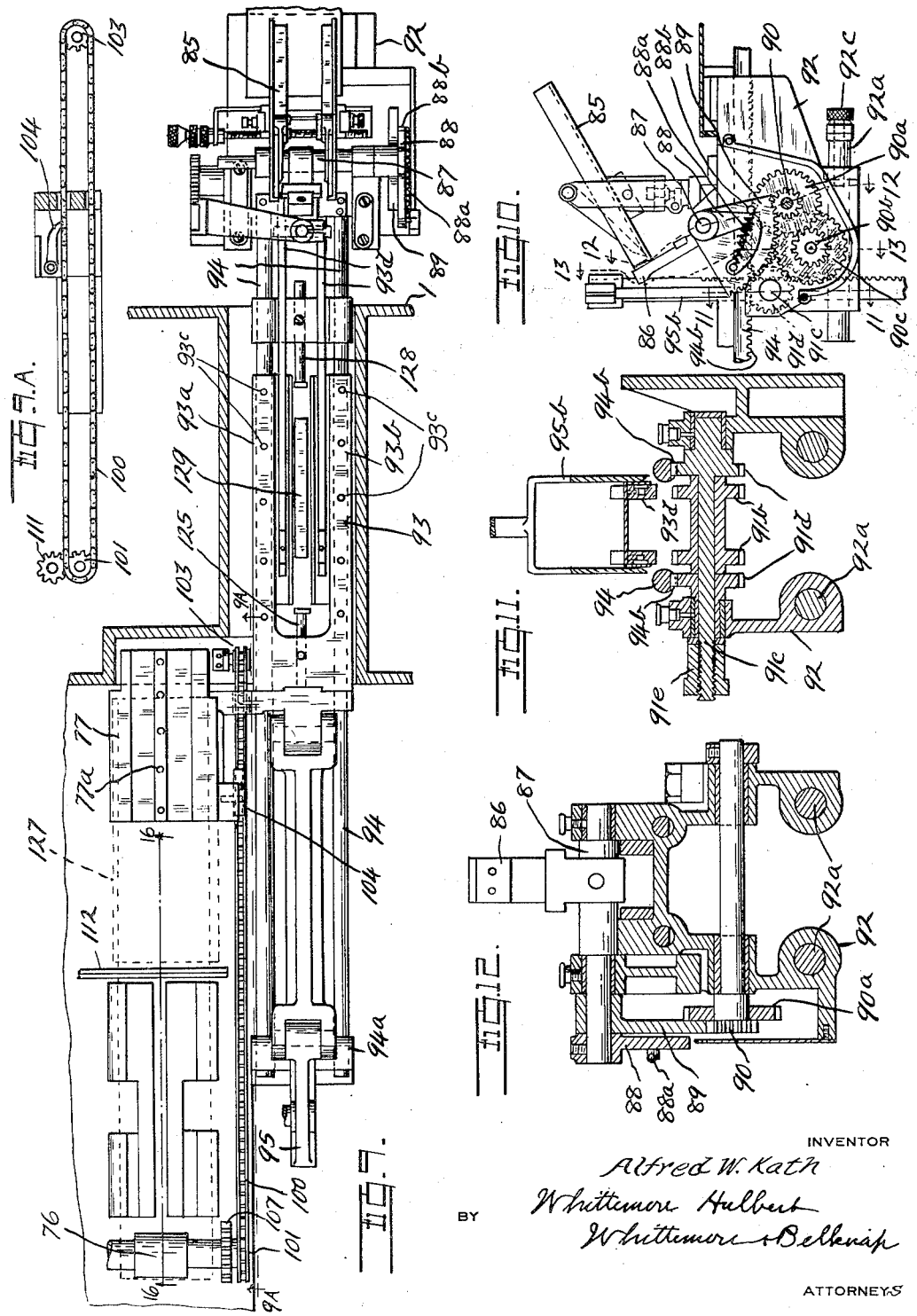
INVENTOR
Alfred W. Kath
Whittemore Hulbert
Whittemore & Belknap
BY
ATTORNEYS

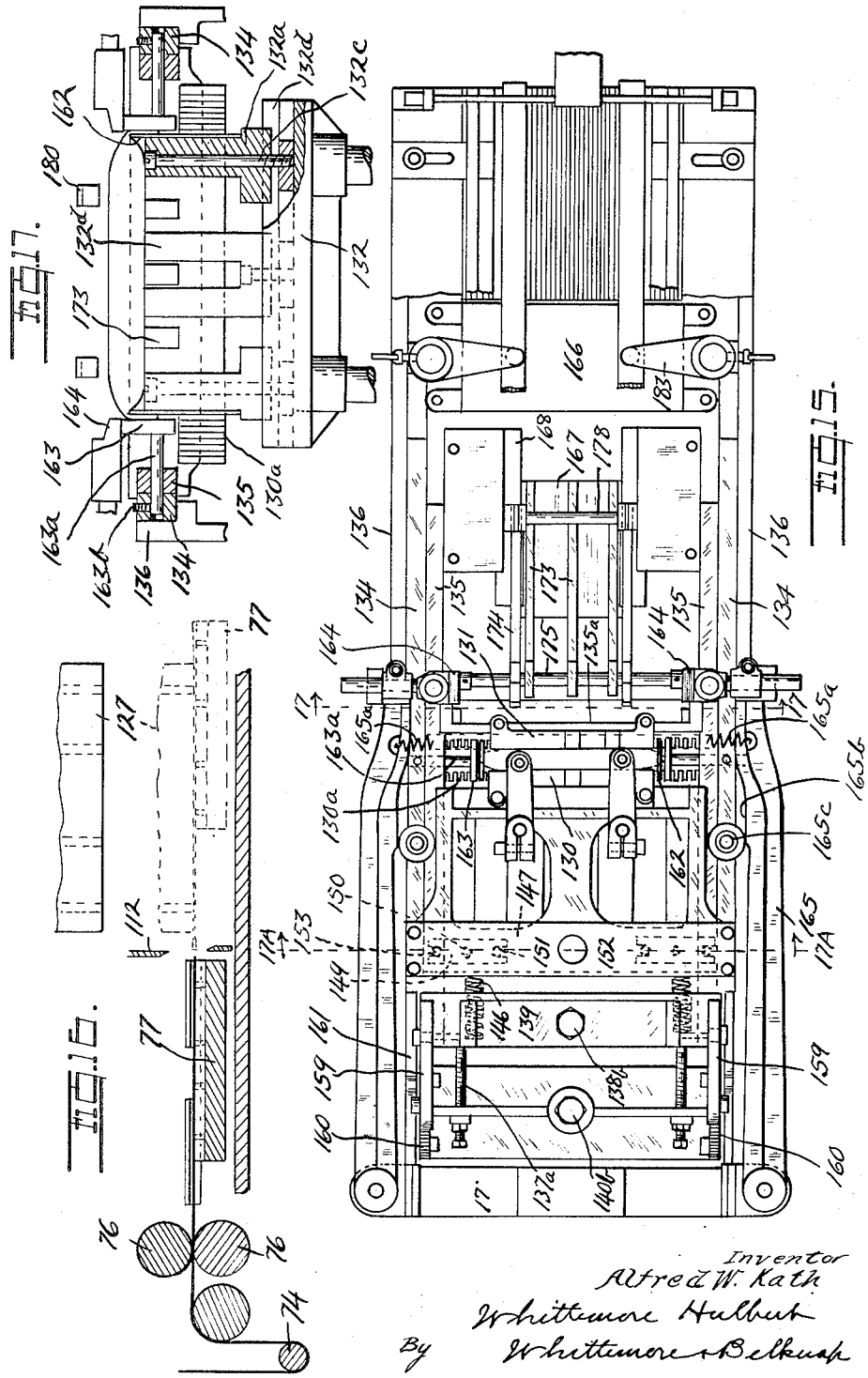

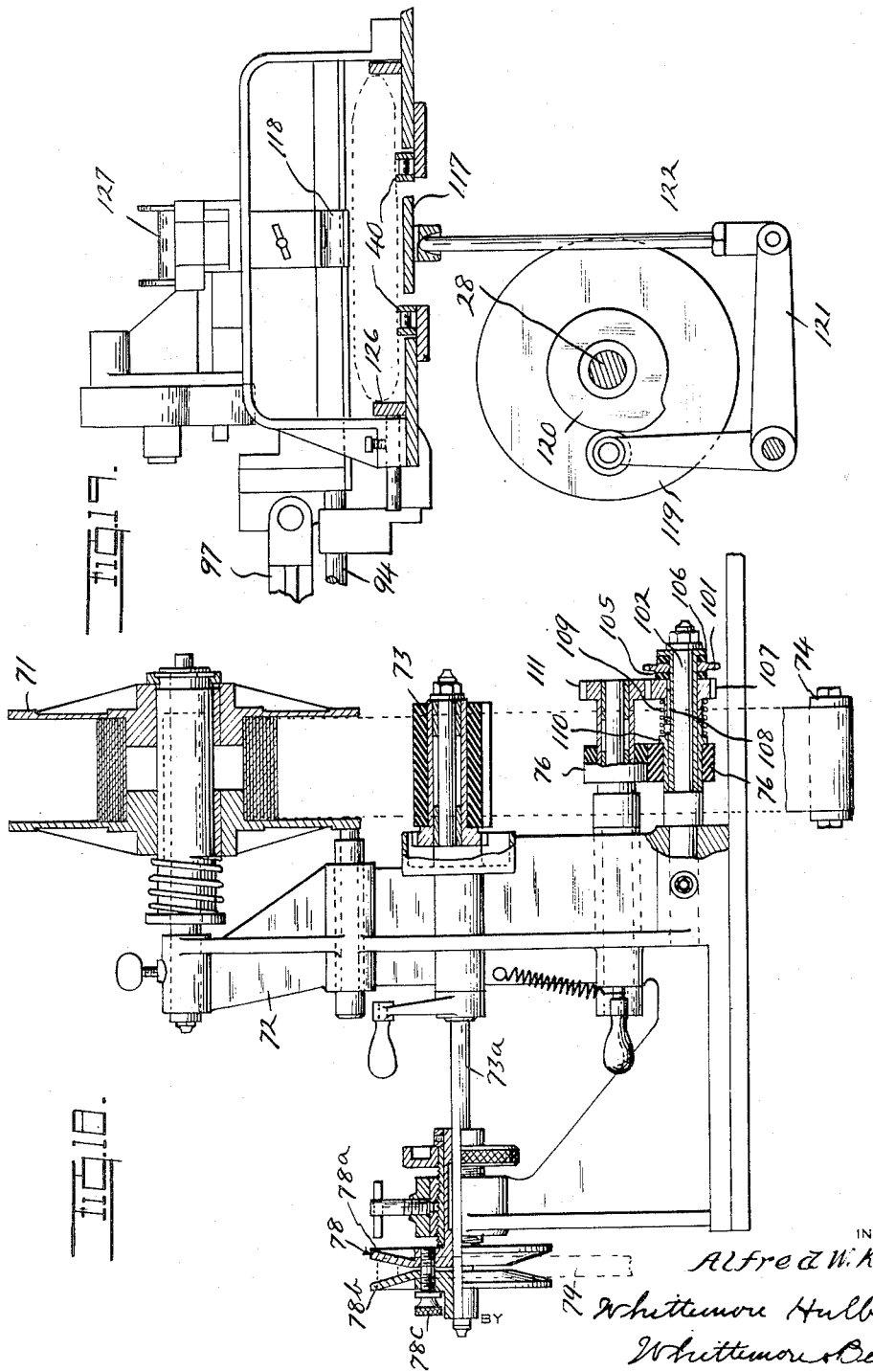

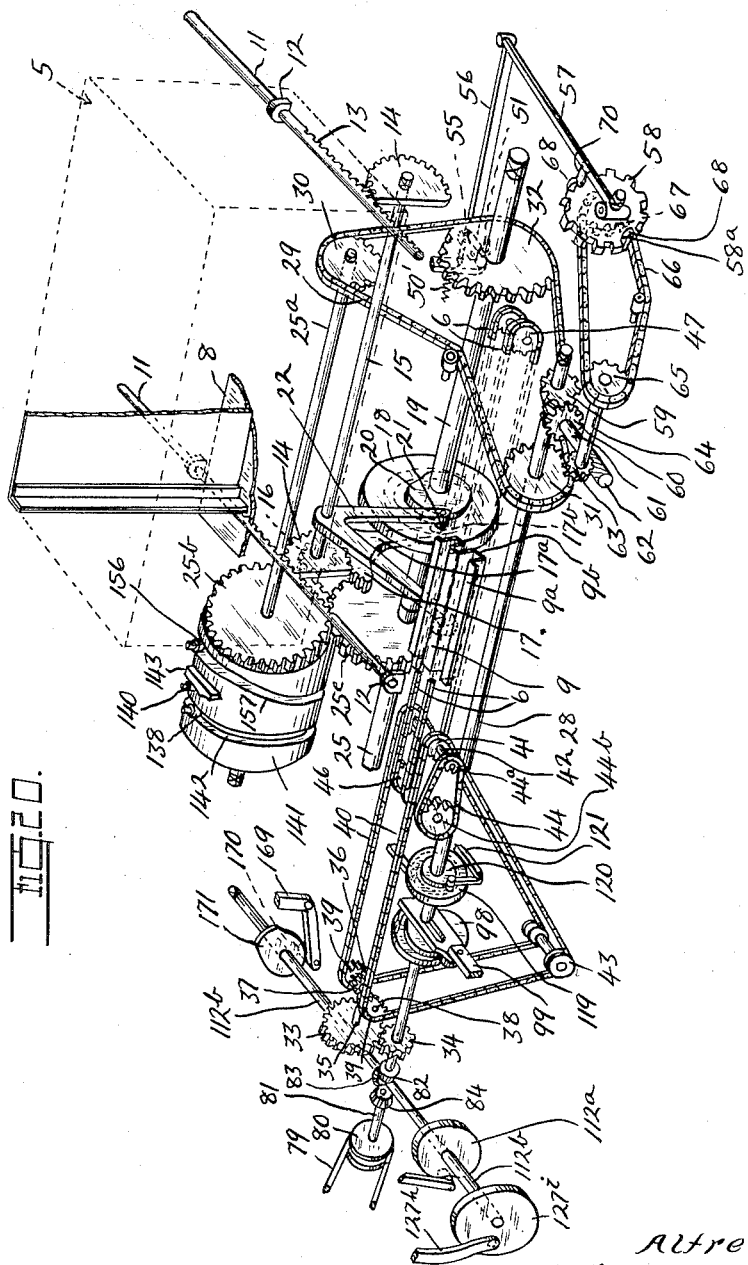

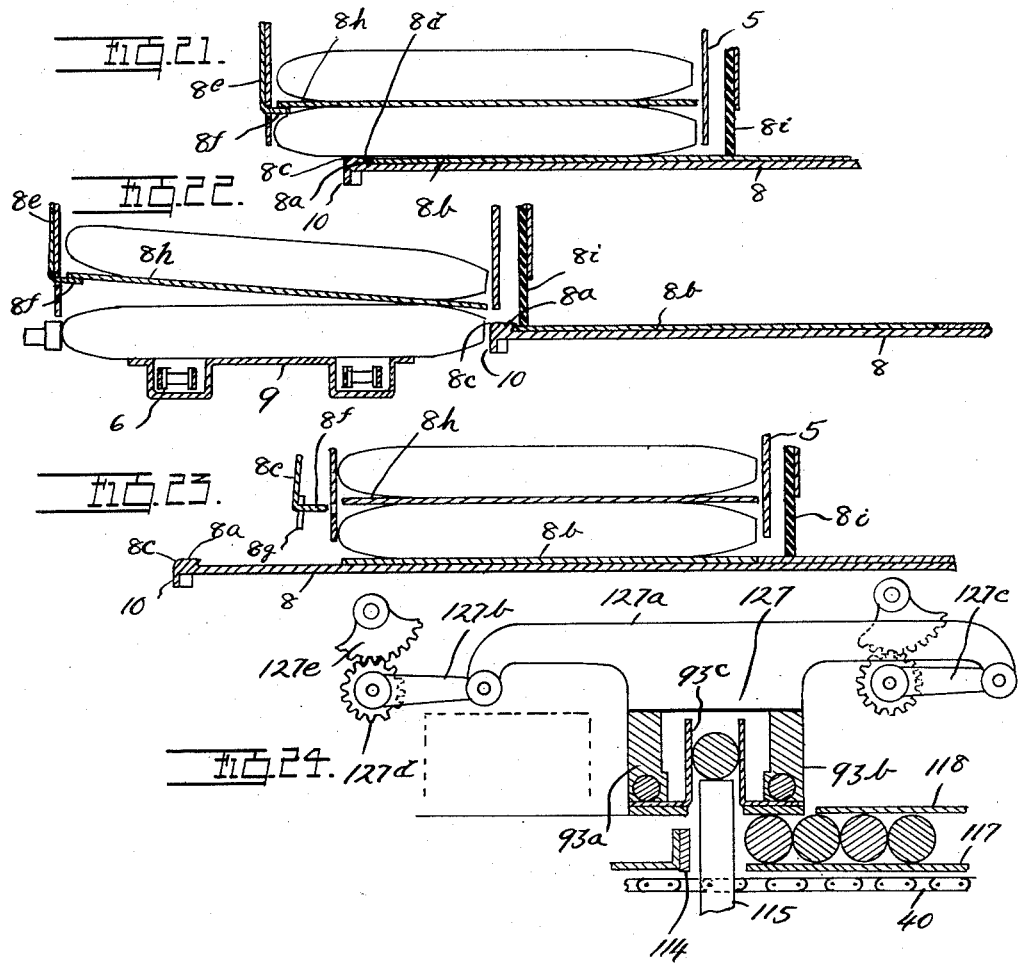
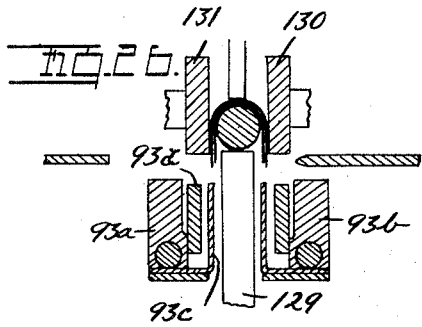
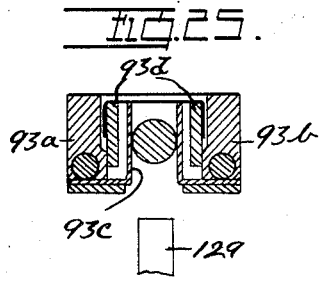

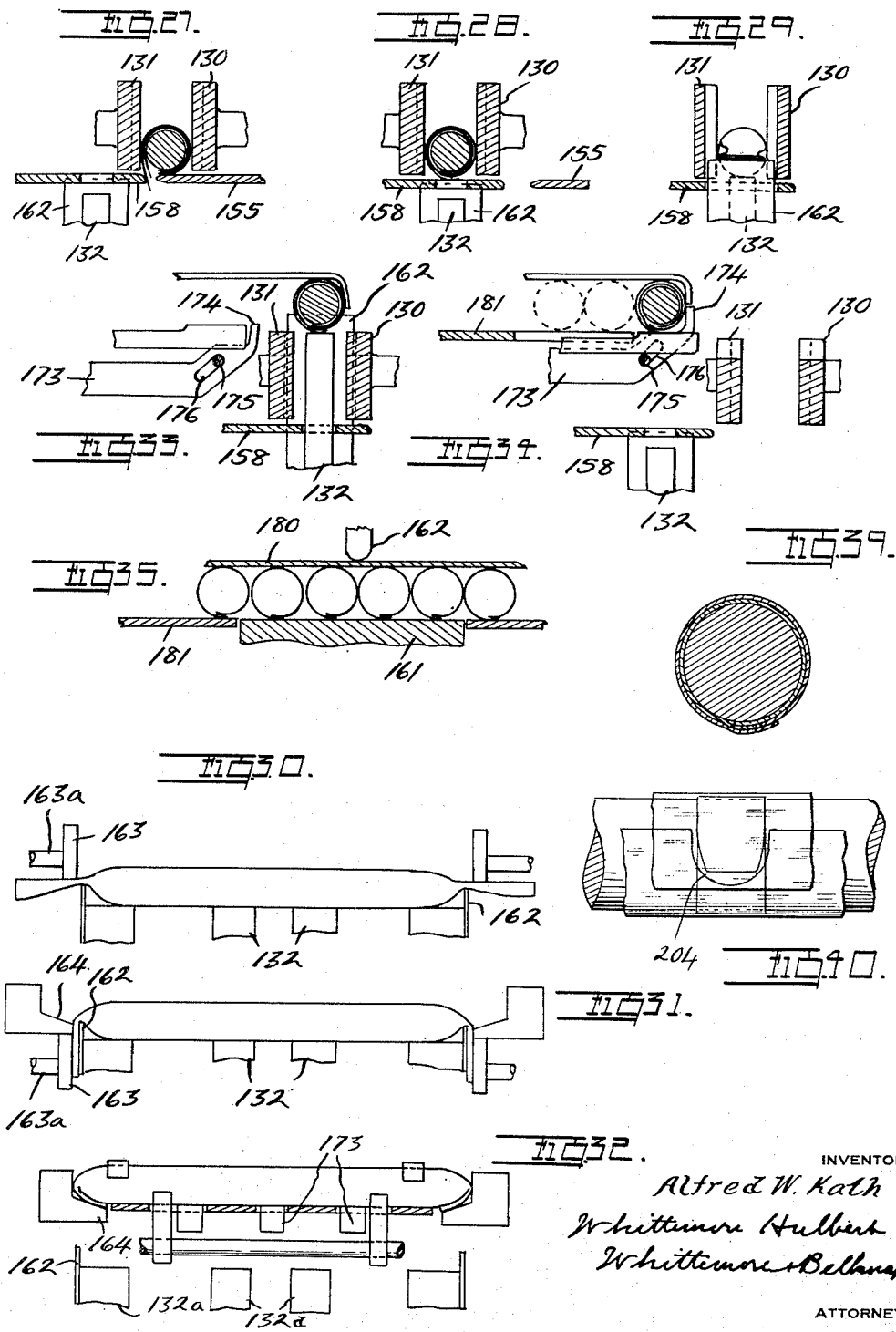

June 23, 1936.  A. W. KATH  2,044,947
CIGAR WRAPPING AND BANDING MACHINE
Filed Oct. 23, 1933  15 Sheets-Sheet 15
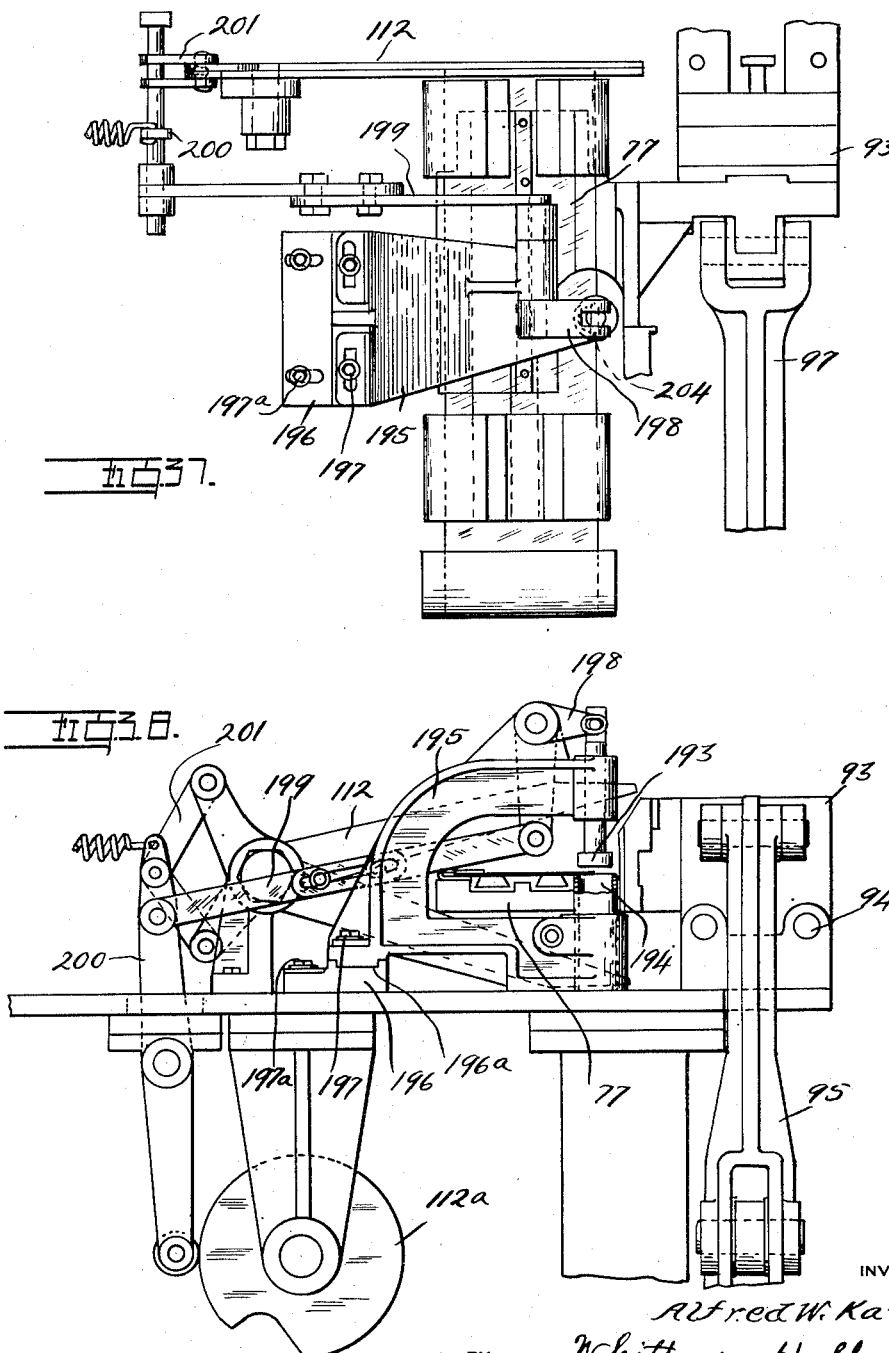
INVENTOR
Alfred W. Kath
BY Whittemore Hulbert
Whittemore & Belknap
ATTORNEYS Patented June 23, 1936

2,044,947

UNITED STATES PATENT OFFICE 2,044,947

CIGAR WRAPPING AND BANDING MACHINE

Alfred W. Kath, Detroit, Mich., assignor to Arthur Colton Company, Detroit, Mich., a corporation of Michigan Application October 23, 1933, Serial No. 694,894

28 Claims. (Cl. 93—2)

The invention relates to the art of banding and wrapping cigars and more particularly to the simultaneous application of the band and wraper to a cigar by the operation of a single machine. Among the objects of the invention are First, to provide for handling cigars of all sizes by the same machine;

Second, to receive the cigars as selected, arranged in superposed rows and pressed, ready for boxing, feeding the cigars individually to the wrapping and banding mechanism and finally delivering the wrapped banded cigars in the same order and without any rotation thereof so that they may be placed in boxes without rearrangement;

Third, to insure the placing of the band in a predetermined position around the cigar and to enclose the same by a transparent wrapper through which the band is plainly visible;

Fourth, to form the wrappers from a continuous strip of wrapping material, cutting the same to the exact lengths required and delivering each wrapper in exact registration with the cigar to be wrapped therein;

Fifth, to maintain a continuous feed of the wrapping material from a reel or source of supply and at an adjustable rate which will deliver the length required for a single wrapper corresponding to the length of the cigar in each cycle of the machine;

Sixth, to provide an intermittent feed mechanism for the end portion of the wrapper strip which holds the same stationary when severed to form an individual wrapper, and which takes care of the accumulating slack in the strip during this period of rest;

Seventh, to deliver the band in registration with the cigar and wrapper and in such position that it will be inside of the wrapper when the latter is folded about the cigar;

Eighth, to avoid the necessity of using any adhesive in securing the band in proper position about the cigar;

Ninth, to simplify the mechanism which folds the wrapper about the cigar;

Tenth, to simultaneously fold the ends of the wrapper over the body of the cigar and heat the same to hold said ends permanently sealed.

With these and many other specific objects in view the invention consists in the construction as hereinafter set forth.

In the drawings:

Fig. 1 is a front elevation of the machine;

Fig. 2 is an end elevation viewed from the left, Fig. 1;

Fig. 3 is an end elevation viewed from the right, Fig. 1;

Fig. 4 is a plan view;

Fig. 5 is a longitudinal section substantially on line 5—5 of Fig. 4;

Fig. 5A is a section on line 5A—5A, Fig. 5;

Fig. 5B is a section on line 5B—5B, Fig. 5;

Fig. 6 is an enlarged elevation, partly in section, of the mechanism for feeding rows of cigars from the receptacle;

Fig. 7 is a longitudinal section on line 7—7 of Fig. 4;

Fig. 8 is a transverse section on line 8—8 of Fig. 4;

Fig. 8A is a plan view of the first elevator actuating mechanism;

Fig. 9 is a plan view of the mechanism shown in Fig. 8;

Fig. 9A is a section on line 9A—9A, Fig. 9;

Fig. 10 is an elevation of the band feeding mechanism;

Fig. 10A is a sectional elevation similar to Fig. 10, broken away to show the connected train of gearing;

Fig. 11 is a cross section on line 11—11 of Fig. 10;

Fig. 12 is a cross section on line 12—12 of Fig. 10;

Fig. 13 is a cross section on line 13—13 of Fig. 10;

Fig. 14 is an elevation looking from the right, Fig. 8;

Fig. 15 is a plan view of the cigar wrapping mechanism;

Fig. 16 is a section on line 16—16, Fig. 9;

Fig. 17 is a section on line 17—17, Fig. 15;

Fig. 17A is a section on line 17A—17A, Fig. 15;

Fig. 18 is a sectional elevation of the wrapper feeding mechanism;

Fig. 19 is a sectional elevation of the elevator for removing the cigar from the row;

Fig. 20 is a diagrammatic perspective view showing the drive mechanism for various parts of the machine;

Figs. 21 to 35 inclusive are diagrams illustrating the successive operations of the machine;

Fig. 36 is a section on line 36—36 of Fig. 5, showing the adjustment for the cam engaging roll;

Figs. 37 and 38 are respectively a plan and side elevation illustrating an attachment to the machine;

Fig. 39 is a cross section through a wrapped and banded cigar showing the band independently secured from the wrapper;

Fig. 40 is a plan view of Fig. 39.

Generally described, my machine comprises a bed or supporting frame 1 mounted on suitable legs or standards 2 and having a motor 3 supported thereon, preferably beneath the bed, and a vacuum pump 4 for developing the suction used by the suction feeders. At one end of the bed is mounted a transversely movable receptacle 5 for holding the cigars in superposed rows as arranged for boxing and for intermittently delivering successive rows into position for feeding to the banding and wrapping mechanism. This feeding mechanism includes parallel feed chains 6 extending longitudinally of the bed and upon which the cigars are carried to the point for successively registering the same with their individual wrappers. The wrapper forming and band applying mechanisms are mounted on the bed respectively to the left and to the right as shown in Fig. 4. In general, these mechanisms function to simultaneously deliver a wrapper and a band in registration with a cigar and in position to be engaged by the wrapping mechanism. This wrapping mechanism performs its successive functions during the progress of the cigar through the machine and finally the cigars are successively delivered in rows ready for reboxing. To facilitate the boxing operation I preferably provide a table 7 on to which the successive rows of cigars are fed and from which they may be taken and placed in the boxes.

*Cigar row feeding mechanism*

In boxing cigars it is required that each box should contain a definite number, such as fifty, arranged in superposed rows or layers having a definite number of cigars in each row. Thus in boxes of fifty it is usual to have four rows or layers which are alternately of twelve and thirteen in each. It is also the practice of cigarmakers to select the cigars according to color and other characteristics in arranging them in the rows for placing in boxes, this being done prior to banding and wrapping. Thus in handling the individual cigars during the banding and wrapping operations, it is quite essential that they should be maintained in the same order for replacement in the box. To accomplish this I provide my machine with an exchangeable receptacle 5, Figs. 1, 4, and 6, corresponding in length and width to the dimensions of the box and adapted to simultaneously receive the contents of one or more boxes. This receptacle is without a bottom but in normal position is arranged above a shelf 8 on the bed and which supports the lowermost row of cigars. Periodically the receptacle 5 is moved transversely of the bed, Figs. 21, 22, and 23, to carry the cigars off from the shelf 8 and over another shelf 9, which latter shelf is arranged between and on each side of the feed chains 6 and normally above the plane thereof, but below the plane of the shelf 8. Thus the lowermost row of cigars will drop below the plane of the shelf 8 with the rear ends of the cigars adjacent to a depending stop flange or shoulder 10 thereon. The receptacle 5 is then moved back to its original position which leaves the lowermost rows of cigars resting upon the shelf 9 while the next higher row will be supported upon the shelf 8. The shelf 9 is then lowered to rest the row of cigars on the chains 6. These are in constant movement and therefore as soon as the shelf 9 is dropped below the upper surface of said chains, the whole row of cigars will travel with the chains to the left, as shown in Figs. 5 and 7.

The mechanism for accomplishing the operations just described comprises a pair of rods 11 on which the receptacle 8 is mounted, these rods being slidably secured in bearings 12 on the bed and being provided on their lower sides with racks 13. These racks are engaged by gears 14 mounted upon a shaft 15 which shaft has also mounted thereon a pinion 16 engaged by a gear segment 17 pivotally mounted on the bed. The gear segment 17 has a lever arm 17ª provided with a projecting pin 17ᵇ which engages a cam groove in a member 18 mounted upon a shaft 19. The arrangement is such that whenever the shaft 19 is rotated through one complete revolution, the lever arm 17ª and gear segment 17 will be oscillated, thereby imparting a rotary movement to the shaft 15 and to the gear segments 14 thereon, which in turn through engagement with the racks 13 will reciprocate the rods 11, carrying the receptacle 5 forward and back by a substantially harmonic movement.

The movement of the shelf 9 is timed with the movement of the receptacle 5 and is actuated by a cam 20 upon the shaft 19, which cam engages a roller 21 on a bell crank lever 22, Figs. 5, 6, and 20, the horizontal arm of which is attached to said shelf. The cam 20 is so fashioned that the shelf 9 is maintained in its raised position until the receptacle 5 has returned, after which it is quickly lowered.

In the pressing of cigars preliminary to boxing it is customary to place cardboard strips between superposed rows so as to prevent the embedding of the cigars of one row into those of another. These cardboard strips are left in position when the pressed cigars are placed in the receptacle 5 and during the delivery of the rows from the receptacle the cardboard strips must be removed therefrom. This, as shown in Figs. 6, 21, 22, and 23, is accomplished by placing upon the forward end of the shelf 8 a hooked shoulder 8ª which is adapted to arrest the lowermost cardboard strip 8ᵇ during the forward movement of the receptacle. The upper face of this strip 8ª is rounded as indicated at 8ᶜ and 8ᵈ so that the cigars will pass thereover without obstruction both during the forward and return movement of the receptacle. I also preferably provide a series of spring catches 8ᵉ on the forward wall of the receptacle having rearwardly extending tongues 8ᶠ for catching under the cardboard strip between the lowermost row and the next higher superposed row of cigars. These spring catches engage a stationary stop 8ᵍ when the receptacle is at the rear end of its movement so as to withdraw the tongues 8ᵉ and permit the downward feeding of the cigars in the receptacle. However, during the forward movement of this receptacle the catches are withdrawn from this stop permitting the tongues 8ᶠ to project beneath the cardboard 8ʰ and supporting the same and the cigars thereabove while the lowermost row drops upon the shelf 9. This shelf 9 extends not only between the chains 6 but is also provided with portions 9ª outside said chains and connected to the central portion by U-shaped loops 9ᵇ passing beneath the chains. The level of the shelf 9 in its uppermost position is below the level of the shelf 8 and thus as soon as the lowermost row has passed over the stop 8ᶜ and beyond the shelf 8, it will drop on to the shelf 9 while the upper rows are still held from dropping by the tongues 8ᶠ. Finally, after the receptacle is returned to its rear position, the stop 8ᵍ disengages the tongues 8ᶠ permitting all of the cigars in the receptacle to drop.

During the rearward movement of the receptacle 5 the cardboard which has been arrested by the stop 8ᵃ is withdrawn from the shelf 8 by the action of a friction shoe, preferably of rubber, 8ⁱ arranged on the rear wall of the receptacle and pressed downward against the cardboard on the shelf. The coefficient of the friction of this shoe being greater than that of the shelf 8, the cardboard 8ᵇ will be moved rearward and deposited in a receptacle 8ʲ from which it may be subsequently taken to be used again in the pressing operation.

*Driving and timing mechanism*

As has been stated, the reciprocation of the receptacle 5 is intermittent so that after depositing one row of cigars it will permit this row to be fed forward by the chains 6 a sufficient distance to clear the next row of cigars deposited on the chains. This necessitates a timing mechanism for controlling the operation of the shaft 19, such that the shaft is only operated after a predetermined number of operations on the individual cigars of the banding and wrapping mechanism, the construction being as follows. Power from the motor 3, (Figs. 3, 5, and 20) is transmitted through a chain 23 to a sprocket 24 upon a shaft 25 extending longitudinally and centrally of the bed 1. A clutch 26 is arranged between the pulley 24 and shaft 25 under the control of a lever 27, by which the machine is started or stopped. From the shaft 25 movement is transmitted to a parallel shaft 25ᵃ through the medium of intermeshing gears 25ᵇ and 25ᶜ at a one-to-one ratio. From the shaft 25ᵃ movement is transmitted to a parallel shaft 28 at a one-to-one ratio through the medium of a chain 29 and sprockets 30 and 31 on the respective shafts. This chain also engages the sprocket 32 revolubly mounted on the shaft 19 but not normally connected thereto. The shaft 28 transmits movement through a gear train comprising intermeshing gear wheels 33 and 34, shaft 35, worm 36 and worm gear 37 to a transversely extending shaft 38 on which are mounted sprockets 39 for a pair of feed chains 40. The chains 40 are arranged in the plane of the chains 6 and form extensions of the feed effected by the latter chains. They are arranged to have portions adjacent to and overlapping the chains 6 which portions then pass around sprockets 41 upon a shaft 42 and around idler sprockets 43 before returning to the sprockets 39. The chains 6 are driven from the shaft 42 through the medium of a step-down chain drive 44 which connects a sprocket 44ᵃ on the shaft 42 with a sprocket 44ᵇ on a shaft 45, said shaft having sprockets 46 for engaging and driving the chains 6. These chains then pass around idler sprockets 47 which are arranged at the forward end of the bed beyond the path of the receptacle 5.

With the construction as just described, it will be understood that whenever the shaft 25 is driven by the motor 3 it will communicate motion at the same angular speed to the shafts 25ᵃ and 28 and that the latter will communicate motion at greatly reduced speed to the sprockets 39 which drive the feed chains 40. Motion is also transmitted through the step-down gearing chain 44 and sprockets 44ᵃ, 44ᵇ, to the shaft 45 and sprockets 46 which drive the chains 6 at a slower speed than the chains 40. Still further motion is transmitted through the chain 29 to the sprocket wheel 32 on the shaft 19 but without normally communicating any movement to said shaft.

To cause the operation of the receptacle 5, the sprocket 32 and its associated parts, the sprocket 32 must be coupled to the shaft 19 to drive the latter, but only through a single revolution, after which it must be again disconnected for a certain number of revolutions of the shafts 25ᵃ and 28. This is accomplished by mechanism of the following construction:

48 is an internal ratchet wheel on one side of the sprocket 32 and 49 is a head on the shaft 19 carrying a pawl 50 which under certain conditions will engage a tooth of the ratchet wheel 48. Normally the pawl 50 is held out of engagement with the ratchet teeth by a pin 51 slidably mounted in a bearing 52 on the frame and projecting into contact with the pawl. The pin 51 is connected to a rack 53 actuated by a segmental rack 54 on a lever 55 fulcrumed in the bearing 52, said lever being connected by a rod 56 with a lever 57 fulcrumed on the frame. Adjacent to this lever 57 is an index wheel 58 driven at slow speed through a mechanism comprising bevel gears 59 and 60 communicating movement from the shaft 28 to a shaft 61, a worm gear 62 on said shaft in mesh with a worm wheel 63 on a shaft 64, a sprocket 65 on the shaft 64 and a chain 66 communicating movement to a sprocket wheel 67 attached to the wheel 58. The timing of this mechanism is such that for one revolution of the shaft 28 the index wheel 58 moves one-fiftieth of a revolution or one revolution of the index wheel for fifth cycles of the machine. Engaged with a plurality of the notches 58ᵃ of the index wheel 58 are cam dogs 68 which at certain points in the revolution of said wheel will engage a lug 70 on the lever 57. This will rock the lever 57 a sufficient distance to withdraw the pin 51 from its engagement with the pawl 50, whereupon a spring 50ᵃ will force said pawl into engagement with the ratchet teeth 48, coupling the sprocket 32 to the head 49 and driving the shaft 19. Before completion of one revolution of the sprocket 32, the cam dog 68 will have disengaged from the lug 70 so that the pin 51 is again in the path of the pawl 50 and will disengage the same from the ratchet 48. Thus each time the pawl 50 is tripped by withdrawal of the pin 51, the shaft 19 will be turned one complete revolution and then will be again disconnected. This single revolution of the shaft 19 will effect a reciprocation of the receptacle 5 and a lowering of the shelf 9 as previously described, to deposit one row of cigars on to the chains 6. The cam dogs 68 are spaced from each other so that the number of cycles of the machine between engagement of said dogs with the lug 70 corresponds to the number of cigars in one row. Thus in the case of a four row fifty-cigar box the distance between said dogs will be alternately twelve cycles and thirteen cycles. Consequently, when a row of thirteen cigars is placed on the chains 6, thirteen cycles of the shafts 15 and 28 will take place before another operation of the receptacle 5 to place a succeeding row on the chains. This next row will have only twelve cigars and consequently there will be twelve cycles of the shafts 15 and 28 before another operation of the receptacle. Cigars are also boxed in rows of two, three or five, with the total number equalling 50. Adjustment of the index can be made for such boxes by properly spacing the dogs 68 in the notches 58ª.

Wrapper feeding mechanism

The wrappers are preferably formed from a strip of transparent material commercially known as "Cellophane" and which is wound upon a reel. The grain of the material extends longitudinally of the strip and the width of the strip is of a dimension suitable for the width of a wrapper. As shown, the roll of material is placed upon a reel 71 which is mounted upon a bracket arm 72 extending upward from the bed 1. From the reel the strip passes downward between feed rolls 73 around an idler pulley 74 on a rockable arm 75, and then between feed rolls 76 to extend horizontally over a reciprocating carrier 77. The length of the wrappers is proportionate to the length of the cigar to be wrapped and as the machine is adapted for wrapping all cigars, the feed mechanism for the strip must be variable. This is accomplished by driving the feed roll 73 which is on a shaft 73ª, from a pulley 78 which in turn is driven through a belt 79 from a pulley 80 on a shaft 81. This shaft is in alignment with the shaft 28 and is driven therefrom at the same angular speed through the medium of bevel gear wheels 82, 83, and 84. The pulley 78 is composed of two conical members 78ª and 78ᵇ which are adjustable towards or from each other by means of a right and left screw threaded stud 78ᶜ. This permits of changing the width of the space between the conical faces of the pulleys so that the belt 79 which is of a V-shaped cross section will be located different radial distances from the axis of the pulley according to the adjustment thereof. Thus an adjustment of the members 78ª and 78ᵇ towards each other will enlarge the radius of the portion of the pulley engaging the belt and will slow the speed of the shaft 73ª and feed roll 73. On the other hand, an adjustment of the pulley to separate the members 78ª and 78ᵇ will permit the belt to assume a shorter radius and will increase the speed of the shaft 73ª and feed rolls 73. The operator may therefore so adjust the pulley that the length of strip fed by the rolls 73 in each cycle of the machine (one revolution of the shaft 28) corresponds to the length of the cigar to be wrapped.

As has been stated, the strip passing through the feed roll 76 is delivered upon a reciprocating carrier 77 which carrier is provided with suction ports 77ª in its upper face to retain the strip in contact therewith. The operation of the feed rolls 76 is intermittent and the peripheral speed of these rolls exactly corresponds to the speed of the carrier 77, which is greater than the speed of the feed rolls 73. As a consequence when the feed rolls 76 are in action, they will take up the slack in the strip which has accumulated during the interval of rest of these rolls in the form of a loop around the vertically movable idler pulley 74. As soon, however, as all slack is taken up, further movement of the rolls 76 is prevented although the carrier 77 may continue to travel. The strip is then severed to form a wrapper of the end portion thereof and the severed wrapper is then transferred into alignment with a cigar by mechanism now to be explained.

Mounted upon the bed 1 is a transversely movable carriage 93 which has guide rods 94 slidable in bearings 94ª and which as will be hereinafter described, forms a transfer carrier for the cigars. This carriage is actuated by a rockable lever arm 95 pivoted at its lower end on a depending bracket 96 on the frame, and at its upper end connected by the link 97 with the carriage 93. Upon the shaft 28 is a cam 98 for actuating a rod 99 pivotally connected to the lever 95 intermediate its fulcrum and the link 97. This cam will therefore impart a substantially harmonic reciprocation to the rod 99 and through the lever 95 and link 97 a similar movement to the carriage 93, with a dwell at each end of the movement of said carriage. Adjacent to the guide rods 94 for the carriage 93 is a chain 100 (Fig. 9) which passes around a sprocket 101 on the shaft 102 of one of the feed rolls 76. At the other end the chain passes around an idler sprocket 103 which is spaced from the sprocket 101 a distance greater than the travel of the carriage 93. Upon the carriage 93 is a pawl 104 which rests upon the upper strand of the chain 100 and is adapted to engage a link thereof so that during the movement of the carriage 93 (to the right, Fig. 9), the chain 100 will be moved with it, but during the reverse movement of the carriage (to the left, Fig. 9) the pawl 104 will slide over the chain without imparting movement thereto. The pitch diameter of the sprocket 101 is the same as the diameter of the feed roll 76 which results in rotating said feed roll at a peripheral speed which is just the same as the speed of the carriage 93. This driving of the roll is not, however, positive, but is accomplished through a friction drive mechanism as follows: The sprocket 101 is revoluble upon the shaft 102, but has arranged upon opposite sides of it friction washers 105, one of which bears against a collar 106, while the other lies adjacent to a gear wheel 107, keyed to the shaft at 108 but longitudinally slidable thereon. 109 is a spring between the sprocket 107 and a collar 110 on the shaft and which is of a tension to develop the desired friction between the washers 105 and the sprocket 101. The gear wheel 107 intermeshes with a gear wheel 111 on the companion roll 76 and the arrangement is therefore such that both rolls 76 will be frictionally driven by the sprocket 101, if such movement is unresisted. When, however, all of the slack in the cellophane formed by the loop around the idler roll 74 is taken up and the arm 75 reaches the limit of its movement, then any further rotation of the rolls 76 is prevented. This is due to the fact that the rolls 73 are rotating at a slower speed and the friction of these rolls upon the cellophane strip is greater than the friction between the sprocket 101 and the washers 105. It will, therefore, be understood that while the carriage 93 always travels the same distance in its reciprocation and while the chain 100 is moved the same distance in one direction, the rolls 76 will only be operated by a portion of the movement of said chain, dependent upon the adjustment of the rate of feed of the rolls 73. This permits of using the same intermittent feed mechanism for the "Cellophane" strip for all cigars without regard to the length thereof or the length of the wrappers to be placed thereon. The reciprocating carrier 77 is formed by a bracket arm on the carriage 93 so that it travels at the same speed as that of said carriage and the strip delivered by the rolls 76.

To sever the wrapper from the strip shears 112 are arranged to extend transversely thereof, these being normally open so as to permit the feeding of the carrier 77 and strip therebetween. As has been stated, the carrier 77 has suction ports 77ª therein which retain the strip in contact therewith. However, the suction is not sufficient to prevent slipping of the strips upon the carrier 77 when the movement of the former ceases and the carrier continues to travel. The effect is merely to hold the strip taut while being severed by the shears. The shears are actuated by a cam 112ª mounted on a shaft 112ᵇ driven by the bevel gear wheel 83 and the timing is such that the strip is severed at the completion of the forward movement of the carriage 93 and before the return thereof. While in this same position the severed strip is lifted from the carrier 77 and deposited on the carriage 93 in registration with the cigar thereon, as will be later described.

*Registration of wrapper with cigar and transfer of both to the wrapping mechanism*

As previously described, the rows of cigars intermittently deposited upon the feed chains 6 are advanced by said chains until they are picked up by the chains 40 which are traveling at a higher rate of speed. The cigars on the chains 40 will be advanced until arrested by an adjustable stop 114. This is located at a point beneath the carriage 93 which latter is of bifurcated form having the furcations 93ª and 93ᵇ spaced a sufficient distance from each other for the reception of a cigar therebetween. As cigars vary in diameter, angle flanges 93ᶜ are adjustably secured to the furcations so as to space the vertical flanges thereof to correspond to the particular size of cigars operated on. Beneath the end cigar which is in contact with the stop 114 is an elevator 115, this being provided with slots 116 registering with the chains 40 so as to permit of lifting the cigar from said chains without interference therewith. To hold the succeeding cigars from movement during such lifting of the end cigar, there is a hinged table 117 arranged between the chains 40 which when moved upward will lift the cigars from said chains and press them against a yieldable resilient clamp 118. Thus during the lifting of the one cigar, all succeeding cigars in the row are held from movement but upon the return of the elevator 115 to its lower position and the dropping of the table 117, the cigars will again be advanced up to the stop 114. For accomplishing the movements just described, there is arranged upon the shaft 28 a cam member 119 on one side of which is a cam 120 engaging a bell crank lever 121 connected by a link 122 with a table 117. The opposite side of the member 119 is provided with a cam groove for engaging a roller 123 on a lever 123ª, fulcrumed at 123ᵇ and having a segmental rack 123ᶜ which is in mesh with a depending rack 124 on the elevator 115. Thus the one cam groove will actuate the clamping table 117 and the other will cause the raising and lowering of the elevator. In its upward movement the elevator 115 will lift the end cigar into the space between the furcations 93ª and 93ᵇ. An adjustable end stop 125 is arranged between the furcations to engage the end of the cigar and to exactly position the same, this stop being adjusted for cigars of different lengths. There is also an adjustable stop 126 for the end of the cigar while in engagement with the stop 114 and which is aligned with the stop 125.

Prior to the raising of the cigar by the elevator 115 the wrapper which has been severed from the strip and is upon the carrier 77 is engaged by an oscillating suction head 127 which lifts it from said carrier and deposits it upon the top of the carriage 93 so as to extend across furcations and over the cigar. Suction apertures 93ᶜ in the furcations 93ª and 93ᵇ serve to hold the wrapper in this position where it is in exact registration with the cigar ready to be wrapped therearound. The mechanism is so timed that after both the cigar and the wrapper have been engaged with the carriage 93 the lever arm 95 is actuated by the cam 98 to move the carriage forward, carrying with it both the cigar and the wrapper. At the forward limit of this movement there is an adjustable stop 128 which engages the end of the cigar so that the latter will be held between stops 125 and 128 while in this position. The suction head 127 is mounted on an oscillating frame 127ª, the opposite ends of which are pivotally connected to crank arms 127ᵇ and 127ᶜ. These are actuated by gears 127ᵈ which in turn are actuated by gear segments of longer radius 127ᵉ connected to each other by the link rod 127ᶠ. One of these gear segments is actuated by a crank arm 127ᵍ and connecting rod 127ʰ from a crank 127ⁱ on a shaft 112ᵇ, which is driven by the bevel gear wheel 83. Thus one complete rotation of the crank 127ⁱ will rock the crank arm 127ᵍ and connecting mechanism so as to rotate the crank arms 127ᵇ and 127ᶜ through 180°, thereby moving the suction head 127 from a position in registration with the wrapper on the carrier 77 to a position in registration with the carriage 93. The timing is such that the suction head 127 engages the carrier 77 when at the forward end of its movement (to the right, Fig. 9), and engages the carriage 93 when in its rearward position (to the left, Fig. 9). Also, the registration of the suction head with the wrapper on the carrier 77 occurs prior to the severing of said wrapper from the strip by the shears 112, thereby holding the wrapper from displacement during such severing operation.

*Band applying mechanism*

As the cigar band and wrapper are to be simultaneously applied to the cigar, the machine must be provided with a band delivering mechanism which coacts with the wrapper delivering mechanism. In my copending application for patent Serial No. 663,079, filed March 27, 1933, I have described one form of band feeding and applying mechanism which is adapted to affix a band to each wrapper before the latter is delivered in registration with the cigar. This same mechanism could be used in the machine forming the subject matter of this application but I preferably employ a simpler form of mechanism and one which dispenses with the use of adhesive for attaching the band to the wrapper. This mechanism is arranged on the right hand side of the machine, Fig. 4, and cooperates with the mechanism for transferring a cigar and a wrapper into registration with the wrapping mechanism as will now be described.

The bands to be applied to the cigars are placed in a stack in a holder 85 which is supported in inclined position upon the frame at the right hand side thereof. Adjacent to the lower end of the holder is mounted a rockable suction head 86 which in one position is pressed against the lowermost band in the stack after which it is dropped downward to a substantially horizontal position, the suction removing the band and holding it upon the head. The rockable suction head 86 is mounted on a rock shaft 87 which is actuated by a rock arm 88 yieldably connected by a spring 88ª with the gear segment 89 in mesh with a pinion 90, which latter is driven through a step-down gear train 90ᵃ, 90ᵇ, 90ᶜ, 90ᵈ, from a rotary shaft 91. This shaft has mounted thereon a pair of spaced gear wheels 91ᵃ which are in mesh with gear wheels 91ᵇ on a shaft 91ᶜ, said shaft also having a pair of gear wheels 91ᵈ on opposite sides of the gear wheels 91ᵇ. All of this mechanism is mounted on a frame 92 which is adjustably supported on rods 92ᵃ extending horizontally outward from the frame 1. The positioning of the frame 92 is such that the gear wheels 91ᵈ are in alignment with the rods 94 of the carriage 93 which rods extend over said gear wheels and are provided on their under sides with racks 94ᵇ in mesh therewith. Consequently whenever the carriage 93 is reciprocated, movement is transmitted from the racks 94ᵇ to the gear wheels 91ᵈ, thereby driving all of the connected mechanism above described and rocking the suction head 86 from a position where it contacts with the lowermost band of the stack to a substantially horizontal position.

In mesh with the gear wheels 91ᵃ are parallel rack bars 93ᵈ which slidably engage bearings 93ᵉ on the frame 92. As the gear wheels 91ᵃ are rotated in opposite directions from the gear wheels 91ᵇ with which they are in mesh, it is obvious that when the carriage 93 and racks 94ᵇ are moving in one direction, a similar movement but in the reverse direction will be imparted to the racks 93ᵉ. These racks are so spaced that the suction head 86 in its substantially horizontal position, lies therebetween, so that the band removed from the stack will rest on the upper faces of said bars. The position of these bars is also such that at the inward end of their movement they will extend into the space between the angle flanges 93ᶜ and the furcations 93ᵃ and 93ᵇ of the carriage 93, as shown in Fig. 24.

Adjacent to the holder 85 and rockable suction head 86 is a vertical bearing 85ᵃ in which is slidably secured an inverted U-shaped member 85ᵇ adapted to embrace the rack bars 93ᵈ and suction head 86 when the latter is in a horizontal position. The member 85ᵇ is supported upon an arm 85ᶜ which in turn engages a vertical movable rod 85ᵈ. This rod has a rack face 85ᵉ and is reciprocated by engagement therewith of a pinion 85ᶠ on a shaft 85ᵍ. The shaft 85ᵍ has mounted thereon the gear wheels 90ᵇ and 90ᶜ previously described from which it is driven. The arrangement is such that when the suction head 86 moves downward carrying with it a band, this band will be laid over the rack bars 93ᵈ, after which the U-shaped member 85ᵇ will be lowered to bend the projecting ends of the band downward adjacent to the sides of said rack bars. These rack bars have suction ports therein which register with the band and so that the latter will be held upon the rack bars after the suction of the head 86 is relieved and during the inward movement of said rack bars, the band will be carried therewith in between the furcations 93ᵃ, 93ᵇ and the angle flanges 93ᶜ, as before described. In this position the band will be beneath the wrapper supported on the furcations 93ᵃ, 93ᵇ and above the cigar between the angle flanges 93ᶜ. The turning down of the ends of the band is important, inasmuch as the length of the band is greater than the distance between the furcations 93ᵃ, 93ᵇ. Consequently there would be no room for inserting the band between the cigar and wrapper without thus bending down its ends. Also by applying the suction to these bent down ends the band is held more firmly in position than if merely secured on the top of the carrier.

To properly position the band in relation to the cigar, the frame 92 may be adjusted on the rods 92ᵃ by means of an adjusting screw 92ᶜ. When such adjustment is made, the gear wheels 91ᵈ must roll under the rack bars 94ᵇ and to avoid rotating the rest of the mechanism, these gear wheels may be loosened from the supporting shaft therefor. Thus as shown in Fig. 11, the shaft 91ᶜ has the gear wheels 91ᵇ and one of the gear wheels 91ᵈ sleeved thereon but normally clamped by a threaded collar 91ᵉ at the end of said shaft, bearing against the end sleeve. Thus by loosening the nut 91ᵉ adjustment of the frame 92ᵃ may be made, permitting rotation of the gear wheels 91ᵈ as they travel along the racks 94ᵇ but without imparting any movement to the gear wheels 91ᵇ and the rest of the mechanism connected therewith.

*Operation of mechanism for registering the cigar, wrapper and band with the wrapping mechanism*

With the mechanism thus far described, it will be understood that in each cycle of the machine a cigar is removed from the frictionally fed row by the elevator 115 and is engaged between the flanges 93ᶜ of the transfer carrier 93. Also that a wrapper which has been severed from the "Cellophane" strip is delivered by the suction head 127 and deposited on top the furcations 93ᵃ, 93ᵇ of said carrier. Also, a band is removed from the stack, deposited on the rack bars 93ᵈ and has its ends bent downward over the sides of said rack bars by the U-shaped frame 95ᵇ, all of which operations have been completed while the carriage 93 is at the left end of its movement, Figs. 8 and 9. The carriage 93 is then moved to the right, carrying the cigar and the wrapper with it, while the rack bars 93ᵈ are simultaneously moved to the left. This places the cigar, band and wrapper in proper registration with the wrapping mechanism as shown in Fig. 8. In order that the band may be removed with the rack bars 93ᵈ without interference from the suction head 86, the latter is permitted to dwell in its horizontal position, which is accomplished by the spring 88ᵃ connecting the rock arm 88 with the gear segment 89. Thus when the suction head 86 has moved downward to the horizontal position, the spring 88ᵃ will yield, permitting the head to remain in this position while the U-shaped member is lowered to bend the ends of the band around the rack bars 93ᵈ. Also, in the reverse movement of the mechanism, the suction head will remain stationary for an interval, while the spring 88ᵃ is contracting and until a pin 88ᵇ on the gear segment 89 contacts with the rock arm 88 and positively moves the same.

*Cigar wrapping mechanism*

While the cigar, wrapper and band are in registration by the operation of the mechanism just described, they are all disengaged from their respective holders and simultaneously moved upward. This is accomplished by an elevator 129, the upper face of which forms a support for the cigar while being transferred by the carriage 93. Before the carriage is returned this elevator is raised to force the cigar upward out of engagement with the flanges 93ᶜ, carrying with it the band and the wrapper, all of which are forced upward between a pair of jaws 130 and 131 located above the transfer. These jaws at the time the cigar is raised are spaced from each other sufficiently to provide clearance for the cigar and for the wrapper, which latter is bent in the form of a U-shaped loop embracing the cigar and with its opposite side portions extending downward. Before completion of the upward movement the jaws 130 and 131 are moved towards each other under resilient pressure so as to clamp the sides of the wrapper against the cigar and cause the loop to be tightly drawn around the upper face thereof by frictional resistance of the jaws. The jaws 130 and 131 with the cigar clamped therebetween are then together moved in a direction to the right, Fig. 15, into registration with a third elevator 132. During such movement the depending flaps of the wrapper are folded beneath the cigar by mechanism that will be presently explained, so that the elevator 132 when raised will engage the cigar completely surrounded by the wrapper and will move it upward out of engagement with the jaws 130 and 131. During this last movement the tubular ends of the wrapper projecting beyond the ends of the cigar are collapsed and folded under to complete the enclosure.

For accomplishing the operations just described, the elevators 129 and 132 are actuated by a cam member 133 arranged therebetween and mounted upon the shaft 25. Cam grooves on the opposite faces of this member 133 engage rollers on the shanks of the elevators 129 and 132 and the grooves are so shaped as to operate the elevators in proper sequence. The jaw 130 is carried by a floating frame 147 and the jaw 131 is mounted on a cross bar 135ᵃ on a frame 135. There is also a frame 134 adjacent to the frame 135, which frames are independently slidable in guideways 136 mounted upon the bed. The frame 134 has a cross member 137 having depending therefrom a roller 138 and the frame 135 has a cross member 139 provided with a depending roller 140. 141 is a cam mounted on a shaft 25ᵃ beneath the cross members 137 and 139 having a peripheral groove 142 and a flange 143 to respectively engage the rollers 138 and 140. The cam 141 and shaft 25ᵃ are driven from the shaft 25 through the medium of spur gears 25ᵇ and 25ᶜ as previously described so as to have the same angular speed as said shaft and during each cycle of this operation to impart a reciprocating movement to the frame 134 a sufficient distance to carry the jaws 130 and 131 from a position in registration with the elevator 129 to a position in registration with the elevator 132. This movement of the jaws between the two elevators is effected primarily by movement of the frame 134 which is actuated by the roller 138 engaging the cam groove 142. The operation of the frame 135 by the roller 140 engaging the cam flange 143 is only for the purpose of properly spreading the jaws apart when in registration with the elevator 129 so that the cigar and wrapper may be freely moved upward between said jaws as has been previously described. However, before any movement of translation is imparted to these jaws from this initial position, the roller 140 is disengaged by its cam 143 to permit the jaws to be yieldably pressed against the cigar therebetween, as previously described. This movement of the jaws towards each other is accomplished by springs 146 which are arranged between the cross bar 139 and the floating frame 147, yieldably pressing these members in a relative direction to close the jaws. Such movement is, however, limited by a connecting linkage between these frames including a lever 149 centrally pivoted upon a cross bar 152 by a pin 150. One end of this lever is slotted to engage a pin 151 on the frame 147, while the other end of the lever is slotted to engage a pin 153 attached to the frame 135 and passing through a slot in the member 147. Thus as soon as the roller 140 is released by the cam 143, the spring 146 actuating through the mechanism just described will move the jaws 130 and 131 an equal amount towards each other, pressing the same against the cigar and the wrapper. This arrangement permits of adjusting the jaws to receive cigars of different diameters and at the same time to move the jaws equally so as not to disturb the registration with the elevators. Such adjustment is conveniently effected by mounting the rollers 138 and 140 upon eccentric pins 138ᵃ and 140ᵃ locked in different positions of adjustment by nuts 138ᵇ and 140ᵇ. Thus by loosening the nuts and adjusting the pins the jaws 130 and 131 may be set properly spaced to receive a cigar of any particular diameter.

*Flap tucking mechanism*

During transfer of the cigar from registration with the elevator 129 into registration with the elevator 132, the tucking or folding of the depending flaps of the wrapper is accomplished as has been previously stated. The rear flap is first folded under the cigar by the operation of a blade 155. This blade is slidable in bearings upon the bed and is positioned to be in a plane beneath the jaw 131. The blade is actuated by a roller 156 depending therefrom and which engages a cam groove 157 in the cam member 141. The arrangement is such that when the jaws 130 and 131 start to travel between the position of elevator 129 into registration with the elevator 132, the jaw 155 will move at faster speed, thereby passing beneath the cigar clamped between said jaws and folding the rear flap of the wrapper thereunder. Before completion of movement of the jaws 130 and 131, the cigar with the still depending forward flap is carried over a shelf 158 which folds the forward flap under the folded rear flap. While this is taking place, the blade 155 having reached the limit of its forward movement, remains stationary so that the continued forward movement of the cigar will withdraw the same from said blade. This will complete the wrapping of the wrapper around the body of the cigar, leaving cylindrical portions projecting beyond the opposite ends of the cigar when the latter is registered with the elevator 132.

*Wrapper end folding mechanism*

The elevator 132 when operated by the cam 133 will pass upward between the jaws 130 and 131, carrying up with it the wrapped cigar and finally pushing the same out of engagement with the jaws. Before this operation can be accomplished, it is necessary to lock the jaws against further closing under the tension of the spring 146, which is accomplished by a ratchet dog 159 pivotally connected to the frame 134 and engageable with one of a series of ratchet teeth 160 on the frame 155. When these frames 134 and 135 are in rear position or where the jaws 130 and 131 are in registration with the elevator 129, a cam 161 on the frame bears against the dog 159 to lift the same out of engagement with the ratchet teeth 160, so that the jaws 130 and 131 are free to move together to clamp the cigar therebetween. However, in the movement of the frames 134 and 135 towards the elevator 132 the dog 159 passes out of engagement with the cam 161 and drops into engagement with the ratchet teeth 160. Consequently when the cigar is pressed out of engagement with the jaws 130 and 131 by the elevator 132, these jaws are held from any further movement toward each other or any objectionable pinching of the cigar. To prevent an undue squeezing of the cigar by the jaws 130 and 131 while they are traveling between the elevators 129 and 132, screws 137ª on the cross bar 137 are adjustable to form stops for the cross bar 139. These function to prevent a soft cigar from being deformed prior to the engagement of the dog 159 with the ratchet teeth 160.

The folding of the ends of the wrapper is accomplished during the upward movement of the cigar by the elevator 132. The wrapper being of greater length than the cigar extends beyond the opposite ends thereof and these projecting portions move upward between jaws 130 and 131. The elevator 132 has adjustably mounted thereon projecting blades 162 which may be set to just clear the ends of the cigar and which engage the wrapper to tuck the lower side of the tubular extension thereof thereby completing an inward or bellows folding of the opposite sides which are held against outward movement by the jaws 130 and 131. A further upward movement of the elevator carries the cigar and wrapper upward past folders 163 which are adjustably mounted upon the frame 134 through the medium of shanks 163ª. The shanks are secured by set screws 163ᵇ and pass through slots in the frame 135. Thus the folders may be set in relation to the blades 162 so as to flatten the end of the wrapper therebetween during the further upward movement of the elevator. A still further upward movement of the elevator carries the cigar and wrapper into engagement with wedge shaped members 164 which are moved inward beneath the folded ends of the wrapper to press the same against the body of the cigar. The members 164 are mounted upon horizontally extending arms 165 pivoted at their rear ends on the frame 136, so as to be capable of swinging inward. A spring 165ª connecting these arms tends to draw them inward, but they are normally held out by cams 165ᵇ on said arms engaging rollers 165ᶜ on the frame 134. Thus at a certain point in the rearward travel of the frame 134 (to the left, Fig. 15) the rolls 165ᶜ will disengage the cam which permits the arms 165 to be moved inward by the spring 165ª. The members 164 are electrically heated so that when pressed in contact with the folded end of the wrapper they will soften the coating film thereon, thereby causing adhesion between the fold and the body of the wrapper.

*Feed mechanism for the wrapped cigars and longitudinal seam sealing means*

As each wrapped cigar is forced upward by the carrier 132 out of engagement with the jaws 130 and 131, it is engaged by a feeding mechanism by which it is fed to the left, Fig. 5, shoving all previously wrapped cigars before it. At a certain point in the travel of this row of cigars, they pass over a heated plate 166 which presses against the overlapped portions of the wrapper, forming the seam on the under side of the cigar and by softening the coating film, causing adhesion between these portions. Finally, the cigars pass on to the table 7 where the operator takes the successive rows and replaces them in the box.

The feeding mechanism comprises a slide 167 mounted in bearings 168 on the frame and actuated by a bell crank lever 169 which has a roller 170 engaging a cam 171. The cam 171 is mounted upon the shaft 112ᵇ which is driven by the gear wheels 82, 83 from the shaft 28. The slide 167 has mounted thereon a series of arms 173 which when the cigar is being elevated out of engagement with the jaws 130 and 131, are withdrawn from the path thereof, but which are then moved under the cigar to support it while the elevator 132 is lowered. This is permitted by cutting away the elevator at points opposite the arms 173. In addition to the arms 173, hooked arms 174 are arranged for engagement with cigars, these arms being supported and actuated by a rod 175. The rod 175 extends across the frame 134 and passes through obliquely inclined slots 176 in the arms 174. The opposite ends of the arms 174 are provided with slots 177 through which is passed a cross rod 178 engaging a stationary portion of the frame. The construction just described is such that when the jaws 130 and 131 are in registration with the elevator 132, the rod 175 is in a position to hold the hooked members 174 out of the path of the cigar engaged with said jaws. On the other hand, after the cigar has been forced out of engagement with the jaws by the rising of the elevator 132 and while it is supported upon the members 173, the rearward movement of the frame 134 to the left, Fig. 15, to the right, Fig. 5, carrying with it the rod 175, will draw rearward the hooked arms 174. During the initial rearward movement the rod 175 will travel in the slots 176 so as to depress the hooks until they can pass under the cigar in the further movement thereof. On the other hand, when the frame 134 is moved in the opposite direction to carry the jaws 130 and 131 again in registration with the elevator 132, the initial movement of the rod 175 traveling through the slots 176 will raise the hooks on the members 174 behind the cigar which is supported by the members 173 and during the further movement the hooks will carry the cigar with them. This movement is repeated with each cycle of the machine and consequently all the cigars that are in advance of the one raised by the elevator 132 will be fed rearward (to the left, Fig. 5) when the hooks 174 engage the cigar last elevated.

*Adjustment for operation*

Prior to operation, the machine must be adjusted for the particular size of cigar which is to be wrapped and banded. This requires adjustments for both length and diameter of the cigar, in various parts of the machine. For receiving the cigars as arranged for boxing, a receptacle 5 of suitable dimensions is selected and adjusted in position upon the frame 1. As shown in Figs. 1, 4, and 6, the so-called stationary bottom 8 which is beneath the receptacle 5 is adjustable in position upon the bed 1, being secured thereto by clamping screws 177 engaging slots 178 in said bottom. This permits of adjusting the bottom 8 together with the shoulder 10 at the forward edge thereof so as to properly position the row of cigars removed from the receptacle in relation to the feed chains 6. Adjustment is also made of the stop 126, which as shown in Figs. 4 and 6, is a guide bar parallel with the chain 6 and supported at opposite ends by adjustable shanks 126ª. In this way the space between the shoulder 10 and the guide bar 126 is adjusted to exactly correspond to the length of cigars being handled.

Adjustment of the index mechanism is made by arranging the dogs 68 in the notches 58ª of the index wheel 58 corresponding to the number of rows and number of cigars in each row in the box. Thus as previously described, if there are four rows in the box, alternately twelve and thirteen cigars to the row, four of the dogs 68 will be properly positioned on the index wheel.

Adjustment for the width or diameter of the cigars is first made by adjusting the stop 114, which arrests the advancing row of cigars on the feed chains 6 and 44. This is accomplished by clamping screws 114a for the shank of the stop 114 and the adjustment is such that the center of the cigar will be arranged in the central plane of the transverse carrier 93. The angle flanges 93c are also adjusted with respect to the furcations 93a and 93b so that the space between these flanges corresponds to the diameter of the cigar.

Adjustment of the wrapper feeding mechanism is effected through the adjusting screw 78c which moves conical sides 78a and 78b of the pulley 78 towards or from each other, thereby increasing or decreasing the effective diameter of said pulley. The adjustment is such that the speed of rotation of the pulley communicated to the feed rolls 73 will deliver a length of the "Cellophane" strip during each cycle of the machine corresponding to the length of wrapper needed for the cigars handled. The shears 112 are also mounted for adjustment so as to centralize the severed wrapper with respect to the cigars in the advancing row, this being accomplished in the same manner as in my co-pending application for patent Serial No. 663,079, filed March 27, 1933, and therefore need not be described in detail.

Adjustment for proper registration of the cigar with the wrapping mechanism is made by adjustable stops 125 and 128 which are so positioned that when the cigar is transferred by the carrier 93 over the elevator 129 it will be held between these stops in proper registration. Adjustment for registering the band with the cigar and the wrapper is accomplished by adjusting the screw 92c which moves the frame 92 on the supporting rods 92a, thereby determining the limit of inward movement of the rack bars 93d so as to hold the band carried thereby properly positioned in relation to the cigar. While this adjustment is being made the clamping nut 91e is unfastened so as to permit the gear wheels 91d to turn while traveling along the rack bars 94b and without imparting any rotation to the gear wheels 91b.

In the wrapping machine, adjustment of the jaws 130 and 131 to register with the elevator 129 is accomplished by the eccentric bearing pins 138a for the rolls 140a and this also determines the spacing between these jaws when in registration with said elevator to correspond with the diameter of cigar that is being wrapped. The screws 137a are also adjusted to limit the movement of these jaws towards each other under the resilient pressure of the springs 146. For adjusting the end folding mechanism for the wrapper, the blades 162 are adjusted upon the elevator 132. These as shown in Fig. 17 are secured on posts 132a which engage a grooved guideway 132b in the elevator 132 and are clamped in adjusted position by a screw 132c. The blades 162 extend upward beyond the post 132a which latter engage the end of the cigar after the blades have performed their tucking operation. There is also a central post 132d for supporting the central portion of the cigar and the spaces between these posts permit the movement of the members 173 beneath the cigar to hold the same when the elevator 132 is lowered. The blades 162 are of greater width than the posts 132d and in their adjusted position engage one of a series of grooves 130a in the jaws 130 and 131. Thus the blades are wide enough to properly function with cigars of maximum diameter while adjustment for cigars of smaller diameter is permitted by the engagement of the sides of these blades with the grooves 130a.

*Complete operation*

When all of the adjustments as above described have been made, the machine is ready for operation. The operator first places the cigars as pressed, ready for boxing, and with or without the cardboard division strips between rows, in the receptacle 5, which is large enough to hold the contents of a number of boxes. Motion is then imparted to the machine by engaging the clutch 26 which communicates motion first to the shaft 25 and from this to all the other mechanism illustrated in Fig. 20. Each revolution of the shaft 25 constitutes one cycle of the machine which will deliver one cigar completely wrapped, banded and sealed, the successive operations being as follows:

The reciprocation of the receptacle 5 delivers one row of cigars on to the shelf 9, which, after return of the receptacle, is lowered to rest the cigars upon the moving feed chains 6. These will advance the cigars until they come into engagement with the chains 40, which being driven at a higher speed, will accelerate the movement of the row. When, however, the foremost cigar comes in contact with the stop 114, further movement of the cigars is arrested until this foremost cigar is removed by the elevator 115. Thus the feed chains merely function to keep the cigars in the row in contact with each other and after the removal of each foremost cigar to advance the entire row. After a definite number of cycles, depending upon the adjustment of the dogs 68 upon the index wheel, another row of cigars is delivered by the reciprocation of the receptacle 5 and this is repeated as long as the machine is in operation.

The foremost cigar arrested by the stop 114 is raised by the elevator 115 off from the chains 40 and into the space between the flanges 93c on the carriage 93. At the same time a severed wrapper is delivered by the suction head 127 on to the furcations 93a and 93b of the carriage 93 in registration with the cigar and is held in this position by suction. The carriage 93 then moves to the right, Fig. 8, carrying the cigar and registered wrapper into registration with the elevator 129, in which position the cigar is held between the adjustable stops 125 and 128. The elevator 129 is then operated to raise the cigar into engagement with the jaws 130 and 131 which as previously described are first spaced to permit entrance of the cigar and wrapper and then resiliently pressed against the cigar to draw the wrapper tightly therearound. A spring pressed member 179 yieldably bears on the top of the cigar during movement by the elevator to hold the wrapper from displacement after release of suction through ports in the furcations 93a and 93b. The cigar is then advanced by the movement of the jaws 130 and 131 to the left, Fig. 5, during which movement the flaps of the wrapper are folded beneath the cigar as previously described. The wrapped cigar is then in registration with the elevator 132, which is raised, first contacting the blades 162 with the projecting cylindrical ends of the wrapper, then lifting the cigar to carry the same past the members 163 which flatten the ends of the wrapper and then into engagement with the wedge-shaped heated members 164 which fold these ends under and against the body of the wrapper and seal the same thereto. The cigar is supported in this raised position by the members 173 during the lowering of the elevator 132 and is then fed to the left, Figs. 5 and 34, pushing before it the cigars that have been previously wrapped. During successive cycles the wrapped cigars that are thus advanced pass over the heater 166 which seals the longitudinal seam. To facilitate this operation, I have provided means for pressing the cigar against the heated plate 166. This comprises spring strips 180 which rest upon the top of the row of cigars and hold them down upon the table 181 over which they are fed and which extends upon each side of the heater 166. The cigars that are in contact with the heater are subjected to further pressure through fingers 182 contacting therewith, said fingers being secured to arms 183 which in turn are mounted on rods 184 slidably engaging bearings 185 in the stationary frame. The lower ends of these rods 185 are connected to each other by a bar 186 and a spring 187 connected to this bar and anchored on a bracket 188 places the desired downward tension on the fingers 182. When the machine is not in operation the pressure of these fingers is relieved through the operation of cam links 189 pivotally connected at 190 to a rock arm 191 actuated by the clutch lever 27. The cam link rests upon the bracket 188 and engages the bar 186, the arrangement being such that when the lever 27 is moved to release the clutch 26, it will force the cam 189 to lift the bar 186 and withdraw pressure of the fingers 182 from the spring strips 180.

The suction for the various suction heads and suction ports above referred to is furnished by the vacuum pump 4 previously described and is controlled by a series of valves in conduits leading to the various locations. These valves and conduits are not shown in the drawings but the valves are operated by a series of cams 192 which are arranged on the shaft 81. These cams are so fashioned as to properly time the creation and release of suction on the various heads and ports.

With the construction as above described the band is held in place around the cigar by the wrapper and whenever the wrapper is removed the band is detached therewith. It is sometimes desired to leave the band attached to the cigar after removal of the wrapper and to accomplish this I have provided an attachment to the machine. This comprises a punch 193 and cooperating die 194 mounted in a bracket 195 adjustably secured on the frame of the machine. This adjustment is in transverse directions and is accomplished by a plate 196 having a grooved guideway 196ᵃ for receiving the bracket. The bracket is secured to the plate by bolts 197 engaging slotted bearings therein and the plate 196 is secured to the frame by bolts 197ᵃ engaging transversely extending slots. Thus the punch may be positioned in relation to one edge of the "Cellophane" strip which passes between the same and the die 194. The punch is operated once during each cycle by a bell crank lever 198 connected by an adjustable link 199 with a lever 200. This lever is actuated by the cam 112ᵃ and forms a part of the shears operating mechanism, being connected to the shear blades by the toggle levers 201. In operation, when the "Cellophane" strip is stationary after the forward movement of the carriage 93 and during the return movement thereof, the cam 112ᵃ simultaneously actuates the shears and the punch, the former to sever the wrapper and the latter to form a notch 204 in the edge portion thereof. This notch 204 is so located that when the wrapper is wrapped about the cigar the underlapping edge portion thereof is cut away at the point where one end of the band overlaps the other end thereof. As one of the contacting surfaces of the band is gummed, the subsequent heating during the sealing of the longitudinal seam in the wrapper will cause the ends of the band to adhere to each other so that the band will remain on the cigar after the wrapper is removed.

*Some additional advantageous features of the mechanism*

Cigars which have been selected and arranged for boxing are placed in a press which squeezes them together so that they can be placed within the box. This pressing operation changes the shape from that of a circular cross section to a more or less rectangular cross section with rounded corners. It is important in the handling of the individual cigars during the banding and wrapping that they should not be rotated upon their longitudinal axes, as this would prevent them from being properly re-assembled. My construction of machine is one which in every operation upon the cigar from start to finish there is no tendency to rotate the cigar about its longitudinal axis. Thus when the successive rows of cigars are deposited upon the feed chains 6 from the receptacle 5, they are merely lowered with the shelf 9 with no tendency to rotation. If the chains 6 were moved at a high rate of speed there might be a tendency to rotate the cigars when first advanced by said chains, particularly the end cigar of the series. This effect I have avoided by driving the chains 6 at a relatively slow speed, being only sufficient to move one row of cigars from the path of the receptacle 5 before said receptacle is again moved over the chains to deposit another row. It is, however, essential to the operation of the machine that the cigars be advanced at a greater speed than this before they arrive at the stop 114, inasmuch as there is an intermittent operation of the elevator 115. This is provided for by driving the chains 40 at a higher speed than the chains 6 and which therefore provides the necessary interval of time for the intermittent action of the elevator 115 without interference from the succeeding cigars on the chain 6.

During the operation of the elevator 115, the continued movement of the chains 40 might tend to press the cigar in rear of the one being elevated against the latter and thereby causing a rotation thereof about its longitudinal axis. Such result is prevented by the clamping of all of the cigars in rear of the one being elevated through the operation of the hinged table 117 and spring clamp thereabove. The movement imparted to the cigar by each of the elevators is rectilinear, as is also the movement by the travel of the jaws 130 and 131, while during the tucking of the flap by the blade 155 the cigar is tightly clamped between the jaws 130 and 131 to prevent any rotation thereof. Consequently when the cigars are finally delivered on to the table 7 they are in the same order that they were in the rows in the boxes and have not been revolved to disturb the proper engagement of each cigar with the one immediately adjacent in advance or in rear thereof.

What I claim as my invention is:

1. In a cigar wrapping machine, the combination with a mechanism for wrapping an individual cigar during each successive cycle of operation, of means for advancing a row of parallelly arranged cigars, a stop for arresting movement of the advance cigar in the row, a holder for a cigar above and in registration with the cigar engaging said stop, an elevator for moving the cigar in engagement with the stop into engagement with said holder, mechanism for intermittently reciprocating said holder to transfer the cigar therein to a position in operative relation to the wrapping mechanism, and having a movement equal to the length of a wrapper for the longest cigar, a continuously operating variable feeding mechanism for advancing during each cycle of the machine a strip of wrapping material an amount equal to a wrapper of predetermined length, means actuated by the forward movement of said reciprocating holder for advancing therewith the end portion of said wrapper strip as far as permitted by said continuous feed mechanism, means operating during the period of rest of said reciprocating holder for severing the wrapper from the strip previously advanced, and means for transferring the severed wrapper into engagement with said holder in registration with the cigar therein prior to the movement of said holder into operative relation to the wrapping mechanism.

2. In a cigar wrapping machine, the combination of means for wrapping a wrapper about a cigar, of means for transferring a cigar into registration with said wrapping means by a movement parallel to the axis of the cigar, means for carrying a wrapper with the cigar into such position of registration and so as to be located between the cigar and the wrapping means and means engaging the cigar when thus in registration to force the same and the wrapper into engagement with the wrapping means.

3. In a cigar wrapping machine, the combination with means for wrapping a wrapper about a cigar, of means for transferring a cigar into registration with said wrapping means by a movement parallel to the axis of the cigar, means for simultaneously carrying a wrapper with the cigar into such registration, means for separately carrying a band into predetermined registration with said cigar and wrapper with said band arranged between the cigar and wrapper, and means for pressing the cigar into engagement with the wrapping means and thereby carrying with it the wrapper and band with the latter on the inside of the wrapper.

4. In a cigar wrapping machine, the combination with means for wrapping a wrapper about a cigar, of a carrier for a cigar movable parallel to the axis thereof to transfer the cigar into registration with said wrapping means, means for depositing a wrapper on said carrier prior to the transfer of the cigar, means for holding the wrapper on said carrier so as to be between the cigar and the wrapping means when in registration, and band carrying means movable parallel to the axis of the cigar and in a direction opposite the movement of said carrier, being movable simultaneously with said carrier to simultaneously place the band, wrapper and cigar in registration with said wrapping means.

5. In a cigar wrapping and banding machine, the combination with wrapping mechanism, of a plurality of means in different locations for respectively feeding and cutting off wrappers, advancing a row of cigars and separating a band from a stack, and a plurality of means operating during each cycle of the wrapping mechanism for removing a cigar from the row, registering a wrapper with the removed cigar, transferring a cigar and wrapper into registration with the wrapping mechanism, transferring a band into predetermined relation with the cigar and wrapper while thus in registration, and with the band arranged to be on the inside of the wrapper, and means for engaging the registered cigar, wrapper and band with the wrapping mechanism.

6. In a cigar wrapping machine, the combination with means for wrapping a wrapper about a cigar, of a carrier for a cigar movable parallel to the axis thereof to transfer the cigar into registration with said wrapping means, said carrier being bifurcated and having parallel flanges arranged centrally between the furcations spaced to receive the cigar, means for introducing a cigar between said flanges, means for depositing a wrapper on said carrier prior to the transfer movement, means for holding the opposite edges of said wrapper upon the furcations of the carrier, a bifurcated band carrier movable parallel to the axis of the cigar to telescope the furcations thereof in the spaces between said flanges and furcations of said first carrier, means for depositing a band on said band carrier with its opposite end portions bent downward over the sides of the furcations thereof whereby the cigar, wrapper and band will be registered with said wrapping means, and means for moving the cigar, band and wrapper out of engagement with said carriers into engagement with said wrapping means.

7. In a cigar wrapping machine, the combination with means for wrapping a wrapper about a cigar, of feeding means for a row of parallel cigars out of alignment with said wrapping means, a stop for arresting movement of the cigars on said feeding means, means operating in each cycle of the wrapping means for removing the cigar arrested by said stop, a carrier with which the cigar is engaged by said removing means, said carrier being adapted to transfer the cigar in a direction parallel to the axis thereof into registration with said wrapping means, means for severing from a strip of wrapping material a wrapper suitable for the wrapping of a cigar, means for transferring the severed wrapper to said carrier in registration with the cigar thereon, means for holding the wrapper on said carrier during the transfer movement, means for successively removing bands from a stack, means engaging a removed band for feeding the same into predetermined registration with said wrapper and cigar by a parallel movement to said carrier but in the opposite direction and from the opposite side, and means for pressing said cigar, band and wrapper into engagement with said wrapping means.

8. In a cigar wrapping machine, the combination with a carrier, of a pair of jaws mounted and relatively movable thereon to provide a space therebetween for receiving a cigar of maximum diameter, said jaws being of a length to receive a cigar of maximum length, means for resiliently pressing said jaws towards each other, means for setting said jaws to initially space the same for a cigar of predetermined diameter, means for registering a cigar and wrapper with said spaced jaws, means for moving the cigar into the space between said jaws and to thereby loop the wrapper thereabout, and means operating after initial engagement of said cigar and wrapper with said jaws for releasing the same to permit the resilient pressing of the jaws against the wrapper and cigar, whereby during the completion of the engagement the looped wrapper is tightly drawn about the cigar.

9. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, means registering with said jaws respectively at opposite ends of the movement of said carrier for engaging a cigar and wrapper with the jaws at one end, and for disengaging the wrapped cigar from the jaws at the opposite end of the movement of the carrier, and means operating during the movement of the carrier for completing the wrapping of the wrapper about the cigar.

10. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, means registering with the space between said jaws respectively at opposite ends of movement of said carrier for engaging a cigar and wrapper with the jaws at one end and for disengaging the wrapped cigar from the jaws at the opposite end of the movement of the carrier, means operating during the movement of the carrier for completing the wrapping of the wrapper about the cigar, and means operating during the disengagement of the cigar for folding the ends of the wrapper.

11. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, a pair of plungers mounted for reciprocation transverse to the plane of movement of said carrier, and located to register with the space between said jaws respectively at opposite ends of the movement of the carrier, means for actuating each plunger during the dwell of the carrier in registration therewith to engage a cigar with the jaws at one end and to disengage the same from the jaws at the opposite end, means for registering a cigar and a wrapper with the engaging plunger prior to operation thereof whereby the engagement of the cigar will fold the wrapper in a loop about the same and means operable during the movement of the carrier for folding the flaps of the wrapper loop about the cigar to complete the envelopment thereof prior to ejection.

12. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, a pair of plungers mounted for reciprocation transverse to the plane of movement of said carrier, and located to register with the space between said jaws respectively at opposite ends of the movement of the carrier, means for actuating each plunger during the dwell of the carrier in registration therewith to engage a cigar with the jaws at one end and to disengage the same from the jaws at the opposite end, means for registering a cigar and a wrapper with the engaging plunger prior to operation thereof whereby the engagement of the cigar will fold the wrapper in a loop about the same, means for resiliently pressing said jaws against the cigar and wrapper after an initial engagement therewith to tightly draw the loop about the cigar during the completion of movement of the plunger and for holding the cigar and wrapper during the retraction of the plunger and means operable during movement of said carrier for folding the flaps of said wrapper about the cigar.

13. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, a pair of plungers mounted for reciprocation transverse to the plane of movement of said carrier, and located to register with the space between said jaws respectively at opposite ends of the movement of the carrier, means for actuating each plunger during the dwell of the carrier in registration therewith to engage a cigar with the jaws at one end and to disengage the same from the jaws at the opposite end, means for registering a cigar and a wrapper with the engaging plunger prior to operation thereof whereby the engagement of the cigar will fold the wrapper in a loop about the same, means operable during the movement of said carrier for folding the flaps of said loop about the body of the cigar to form a substantially cylindrical wrapper with its ends projecting beyond the ends of the cigar in the space between said jaws, and means associated with the disengaging plunger for tucking the cylindrical ends of the wrapper adjacent to the ends of the cigar to flatten the same and to fold the flattened end inward against the body of the cigar.

14. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, a pair of plungers mounted for reciprocation transverse to the plane of movement of said carrier, and located to register with the space between said jaws respectively at opposite ends of the movement of the carrier, means for actuating each plunger during the dwell of the carrier in registration therewith to engage a cigar with the jaws at one end and to disengage the same from the jaws at the opposite end, means for registering a cigar and a wrapper with the engaging plunger prior to operation thereof whereby the engagement of the cigar will fold the wrapper in a loop about the same, means operable during the movement of said carrier for folding the flaps of said loop about the body of the cigar to form a substantially cylindrical wrapper with its ends projecting beyond the ends of the cigar in the space between said jaws, means associated with the disengaging plunger for tucking the cylindrical ends of the wrapper adjacent to the ends of the cigar to flatten the same and to fold the flattened end inward against the body of the cigar, and means for heating an element of said folding means adjacent to the folded end of the wrapper to effect the sealing thereof.

15. In a cigar wrapping machine, the combination with a carrier, of a pair of jaws mounted and relatively movable thereon to provide a space therebetween for receiving a cigar of maximum diameter, said jaws being of a length to receive a cigar of maximum length, means for resiliently pressing said jaws towards each other, means for setting said jaws to initially space the same for a cigar of predetermined diameter, means for registering a cigar and wrapper with said spaced jaws, means for moving the cigar into the space between said jaws and to thereby loop the wrapper thereabout, means operating after initial engagement of said cigar and wrapper with said jaws for releasing the same to permit the resilient pressing of the jaws against the wrapper and cigar, whereby during the completion of the engagement the looped wrapper is tightly drawn about the cigar, means operating while the cigar and wrapper are clamped by the jaws for completing the cylindrical wrapping and means subsequently operating for folding the projecting cylindrical ends of the wrapper over the ends of the cigar, said latter folding means being adjustable to operate upon cigars of different lengths.

16. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, a pair of plungers mounted for reciprocation transverse to the plane of movement of said carrier, and located to register with the space between said jaws respectively at opposite ends of the movement of the carrier, means for actuating each plunger during the dwell of the carrier in registration therewith to engage a cigar with the jaws at one end and to disengage the same from the jaws at the opposite end, means for registering a cigar and a wrapper with the engaging plunger prior to operation thereof whereby the engagement of the cigar will fold the wrapper in a loop about the same, means operable during the movement of said carrier for folding the flaps of said loop about the body of the cigar to form a substantially cylindrical wrapper with its ends projecting beyond the ends of the cigar in the space between said jaws, a blade on and in advance of the ejecting plunger for tucking the projecting cylindrical end of said wrapper adjacent to the end of the cigar, a member adjacent to the path of the end of the cigar in its ejection movement to fold and flatten the end of the wrapper over said blade and a member for moving said flattened end inward after the cigar has passed the same to press said flattened end portion against the body of the cigar, said members being heated to simultaneously effect the sealing.

17. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, a pair of plungers mounted for reciprocation transverse to the plane of movement of said carrier, and located to register with the space between said jaws respectively at opposite ends of the movement of the carrier, means for actuating each plunger during the dwell of the carrier in registration therewith to engage a cigar with the jaws at one end and to disengage the same from the jaws at the opposite end, means for registering a cigar and a wrapper with the engaging plunger prior to operation thereof whereby the engagement of the cigar will fold the wrapper in a loop about the same, means operable during the movement of said carrier for folding the flaps of said loop about the body of the cigar to form a substantially cylindrical wrapper with its ends projecting beyond the ends of the cigar in the space between said jaws, and means for flattening the projecting cylindrical ends of the wrapper and folding the same against the body of the cigar, said means being adjustable to correspond to cigars of different lengths.

18. In a cigar wrapping machine, the combination with a carrier, of means for oscillating said carrier with a dwell at each end of its movement, a pair of jaws mounted on said carrier and spaced for the reception therebetween of a cigar having its axis parallel to the plane of movement of said carrier, said jaws having a series of slots in the inner faces of their end portions, a pair of plungers mounted for reciprocation transverse to the plane of movement of said carrier, and located to register with the space between said jaws respectively at opposite ends of the movement of the carrier, means for actuating each plunger during the dwell of the carrier in registration therewith to engage a cigar with the jaws at one end and to disengage the same from the jaws at the opposite end, means for registering a cigar and a wrapper with the engaging plunger prior to operation thereof whereby the engagement of the cigar will fold the wrapper in a loop about the same, means operable during the movement of said carrier for folding the flaps of said loop about the body of the cigar to form a substantially cylindrical wrapper with its ends projecting beyond the ends of the cigar in the space between said jaws, a pair of blades on and in advance of the ejecting plunger for tucking the projecting cylindrical ends of said wrapper adjacent to the ends of the cigar, said blades being of a width suitable for cigars of largest diameter and being alternatively engageable with slots in said series of slots in said jaws to adjust the same for cigars of different lengths and means cooperating with said blades for folding the tucked end of the wrapper adjacent to the body of the cigar.

19. In a cigar wrapping machine, the combination with means for frictionally advancing a row of cigars, of wrapping mechanism for cigars laterally offset from said advancing means and in a higher plane, a carrier for successively transferring cigars from said frictionally advanced row into alignment with the wrapping mechanism, said carrier operating in a plane intermediate the plane of said advancing row and of said wrapping mechanism and comprising a bifurcated member having space between the furcations thereof for the reception of a cigar, a plunger for elevating the foremost cigar of said frictionally advanced row into engagement with said carrier, means for delivering a wrapper on said carrier above the cigar therein, and a plunger for elevating the cigar and wrapper at the opposite end of movement of said carrier to engage the same with the wrapping mechanism.

20. In a cigar wrapping and banding machine, the combination with means for wrapping an individual wrapper about a cigar, of means for positioning an individual band unattached to said wrapper in predetermined relation thereto and to the cigar to be wrapped in advance of the wrapping operation, with the band lying between the wrapper and the cigar.

21. In a cigar wrapping and banding machine, the combination with means for wrapping an individual wrapper about a cigar, of means for positioning an individual band unattached to said wrapper in predetermined relation thereto and to the cigar to be wrapped in advance of the wrapping operation, and with the band between the wrapper and the cigar, and means operating subsequent to the wrapping operation for attaching the ends of the wrapper to each other.

22. In a cigar wrapping and banding machine, the combination with means for wrapping an individual wrapper about a cigar, of means for positioning an individual band unattached to said wrapper in predetermined relation thereto and to the cigar in advance of the wrapping operation, with the band lying between the wrapper and the cigar, cooperating means for removing the portion of the wrapper which would lie between the overlapping ends of the band and means operating subsequent to the wrapping operation for attaching the ends of the band to each other to hold the same to the cigar when the wrapper is removed.

23. The method of banding and wrapping cigars comprising the positioning of an individual band on the inner side of a transparent wrapper in predetermined relation thereto and the wrapping of said wrapper about the cigar to encircle the same with said band.

24. The method of banding and wrapping cigars comprising the positioning of a cigar, a transparent wrapper and an individual band in predetermined registration with each other and with the band between the wrapper and the cigar, and in wrapping the wrapper about the cigar to simultaneously encircle the same by the band.

25. In a cigar wrapping and banding machine, the combination with wrapping mechanism, of a plurality of means for delivering respectively at separate points a transparent wrapper, a band and a cigar, means for transferring two of these members into predetermined registration with the third, with the band arranged between the wrapper and the cigar, and means for delivering the registered wrapper, band and cigar to the wrapping mechanism.

26. In a cigar wrapping and banding machine, the combination with wrapping mechanism, of a plurality of means for delivering respectively at separate points, one of which is in operative relation to said wrapping mechanism and the other more remote therefrom, a transparent wrapper, a band and a cigar, means for transferring the more remote elements into predetermined registration with the element in operative relation to the wrapping mechanism and with the band between the wrapper and cigar whereby the band and wrapper are simultaneously wrapped about the cigar with the band inside the transparent wrapper.

27. In a cigar wrapping and banding machine, the combination with wrapping mechanism, of a plurality of means for delivering at separate points, one of which is in operative relation to said wrapping mechanism and the other more remote therefrom, a transparent wrapper, a band and a cigar, and means for transferring the more remote elements into predetermined registration with the element in operative relation to the wrapping mechanism, with the band arranged between the cigar and the transparent wrapper and with its ornamental face adjacent to the wrapper whereby both band and wrapper will be simultaneously wrapped about the cigar with the band inside and displaying its ornamental face through the transparent wrapper.

28. In a cigar wrapping and banding machine, the combination of means for wrapping a wrapper about a cigar, of means for transferring a cigar into registration with said wrapping means by a movement parallel to the axis of the cigar, a plurality of means for delivering at separate points a transparent wrapper and a band, and means for assembling said wrapper and band with said cigar in predetermined registration with the latter and with the band between the wrapper and cigar whereby said band will be wrapped about the cigar inside the wrapper to be displayed therethrough.

ALFRED W. KATH.